(12) United States Patent
Wang et al.

(10) Patent No.: US 10,572,800 B2
(45) Date of Patent: Feb. 25, 2020

(54) ACCELERATING DEEP NEURAL NETWORK TRAINING WITH INCONSISTENT STOCHASTIC GRADIENT DESCENT

(71) Applicant: NEC Laboratories America, Inc., Princeton, NJ (US)

(72) Inventors: Linnan Wang, Piscataway, NJ (US); Yi Yang, Plainsboro, NJ (US); Renqiang Min, Princeton, NJ (US); Srimat Chakradhar, Manalapan, NJ (US)

(73) Assignee: NEC Corporation (JP)

( * ) Notice: Subject to any disclaimer, the term of this patent is extended or adjusted under 35 U.S.C. 154(b) by 513 days.

(21) Appl. No.: 15/423,360

(22) Filed: Feb. 2, 2017

(65) Prior Publication Data
US 2017/0228645 A1    Aug. 10, 2017

Related U.S. Application Data

(60) Provisional application No. 62/291,554, filed on Feb. 5, 2016.

(51) Int. Cl.
*G06N 3/08*  (2006.01)
*G06N 3/04*  (2006.01)

(52) U.S. Cl.
CPC ............... *G06N 3/08* (2013.01); *G06N 3/04* (2013.01); *G06N 3/0454* (2013.01); *G06N 3/084* (2013.01)

(58) Field of Classification Search
CPC ............ G06N 3/08; G06N 3/084; G06N 3/04; G06N 3/0454
See application file for complete search history.

(56) References Cited

U.S. PATENT DOCUMENTS

| | | | |
|---|---|---|---|
| 2015/0248608 A1* | 9/2015 | Higgins | G06N 3/04 706/16 |
| 2015/0379425 A1 | 12/2015 | Dirac et al. | |
| 2017/0213150 A1* | 7/2017 | Arel | G06N 3/088 |

OTHER PUBLICATIONS

Duffner et al. ("An Online Backpropagation Algorithm with Validation Error-Based Adaptive Learning Rate"), Sep. 2007, ICANN 2007, p. 249-258.*
Li et al. ("Efficient Mini-batch Training for Stochastic Optimization"), Aug. 2014, Carnegie Mellon University.*
Allamy et al. ("Methods to Avoid Over-Fitting and Under-Fitting in Supervised Machine Learning"), Dec. 2014, Aligarh Muslim University.*
Avrim Blum, UIUC CS 598 (CRN 62819) Topics in Algorithms (Chapter 6: Machine Learning) Spring 2015 (online), see p. 4 of Chapter 6.

* cited by examiner

*Primary Examiner* — Alexey Shmatov
*Assistant Examiner* — Hansol Doh
(74) *Attorney, Agent, or Firm* — Joseph Kolodka

(57) ABSTRACT

Aspects of the present disclosure describe techniques for training a convolutional neural network using an inconsistent stochastic gradient descent (ISGD) algorithm. Training effort for training batches used by the ISGD algorithm are dynamically adjusted according to a determined loss for a given training batch which are classified into two sub states—well-trained or under-trained. The ISGD algorithm provides more iterations for under-trained batches while reducing iterations for well-trained ones.

2 Claims, 28 Drawing Sheets

Algorithm 1: Inconsistent Stochastic Gradient Descent

Data: d, w
Result: w'

1 begin
2     iter = 0
3     $n = \frac{n_{training}}{n_{batch}}$
4     $\bar{\psi} = 0$
5     $\sigma_\psi = 0$
6     $limit = 0$
7     $loss_{queue} \leftarrow \emptyset$
8     while *not converge* do
9        $broadcast(\mathbf{w})$
10       $[\psi, \nabla\psi] = ForwardBackward(\mathbf{d}_t)$
11       $reduce(\psi)$
12       $reduce(\nabla\psi)$
13       if *iter < n* then
14          $loss_{queue}.push(\psi)$
15          $\bar{\psi} = \frac{\bar{\psi} \cdot iter + \psi}{iter + 1}$
16       else
17          $l = loss_{queue}.dequeue()$
18          $\sigma_\psi = STD(loss_{queue})$
19          $\bar{\psi} = \frac{\bar{\psi} \cdot n - l + \psi}{n}$
20          $limit = \bar{\psi} + 3 * \sigma_\psi$
21       $\mathbf{w} = \mathbf{w} - \eta \cdot \nabla\psi$
22       if $\psi > limit$ *and* $iter > n$ then
23          minimize Eq.17 with Alg.2
24       iter++

*FIG 3*

Algorithm 2: Solving the conservative subproblem to accelerate a under-trained batch

Data: $d_t$, $w$, $w_{t-1}$, *stop*, *limit*
Result: $w$

1 begin
2     $iter = 0$
3     while $iter < stop$ *and* $\psi > limit$ do
4        $[\psi, \nabla \psi] = ForwardBackward(d_t)$
5        $reduce(\psi)$
6        $reduce(\nabla \psi)$
7        $w = w - \zeta\{[\psi_w(d_t) - limit]\nabla \psi_w(d_t) + \frac{\epsilon(w - w_{t-1})}{n_w}\}$
8        $broadcast(w)$
9        $iter++$

*FIG 4*

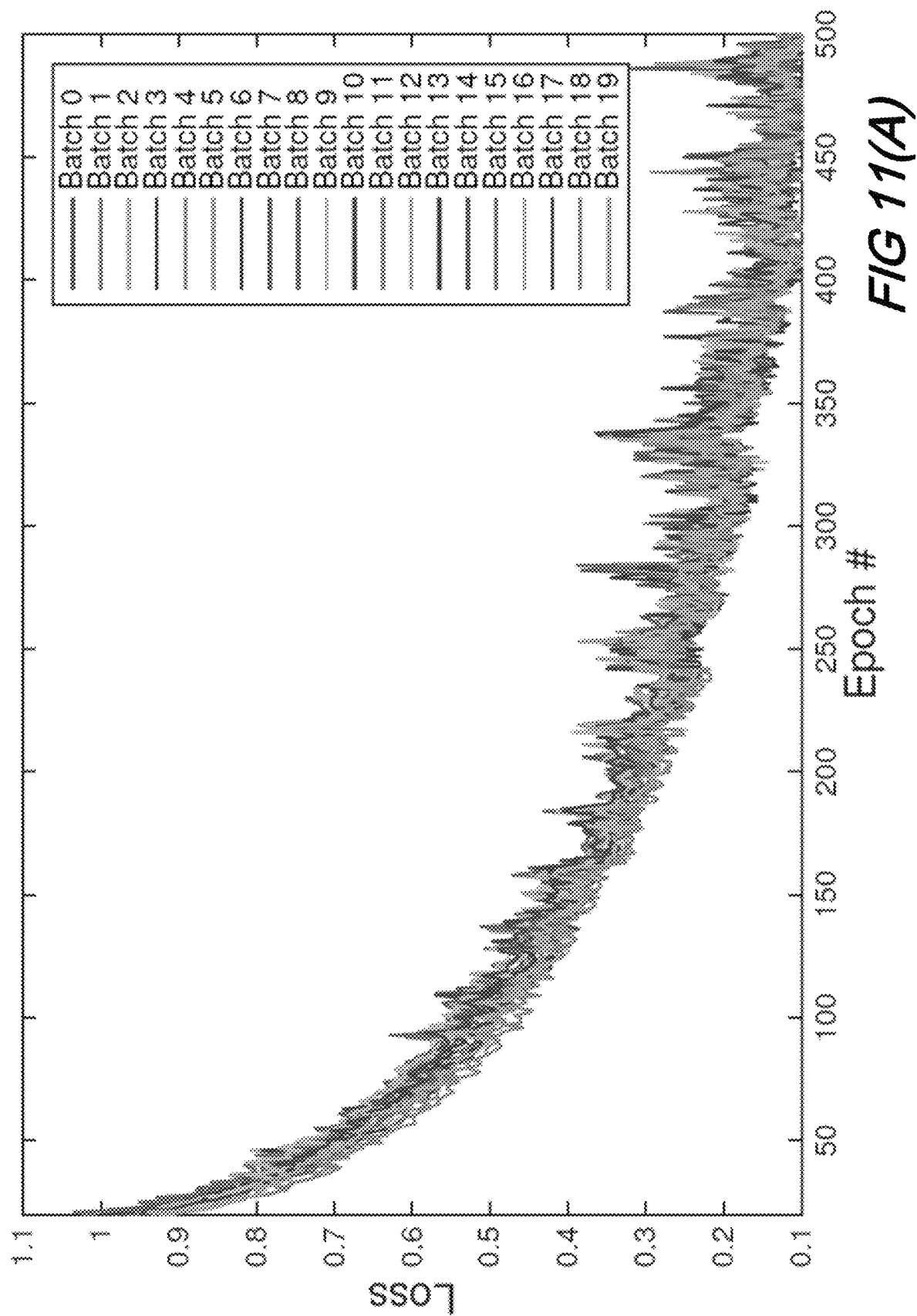

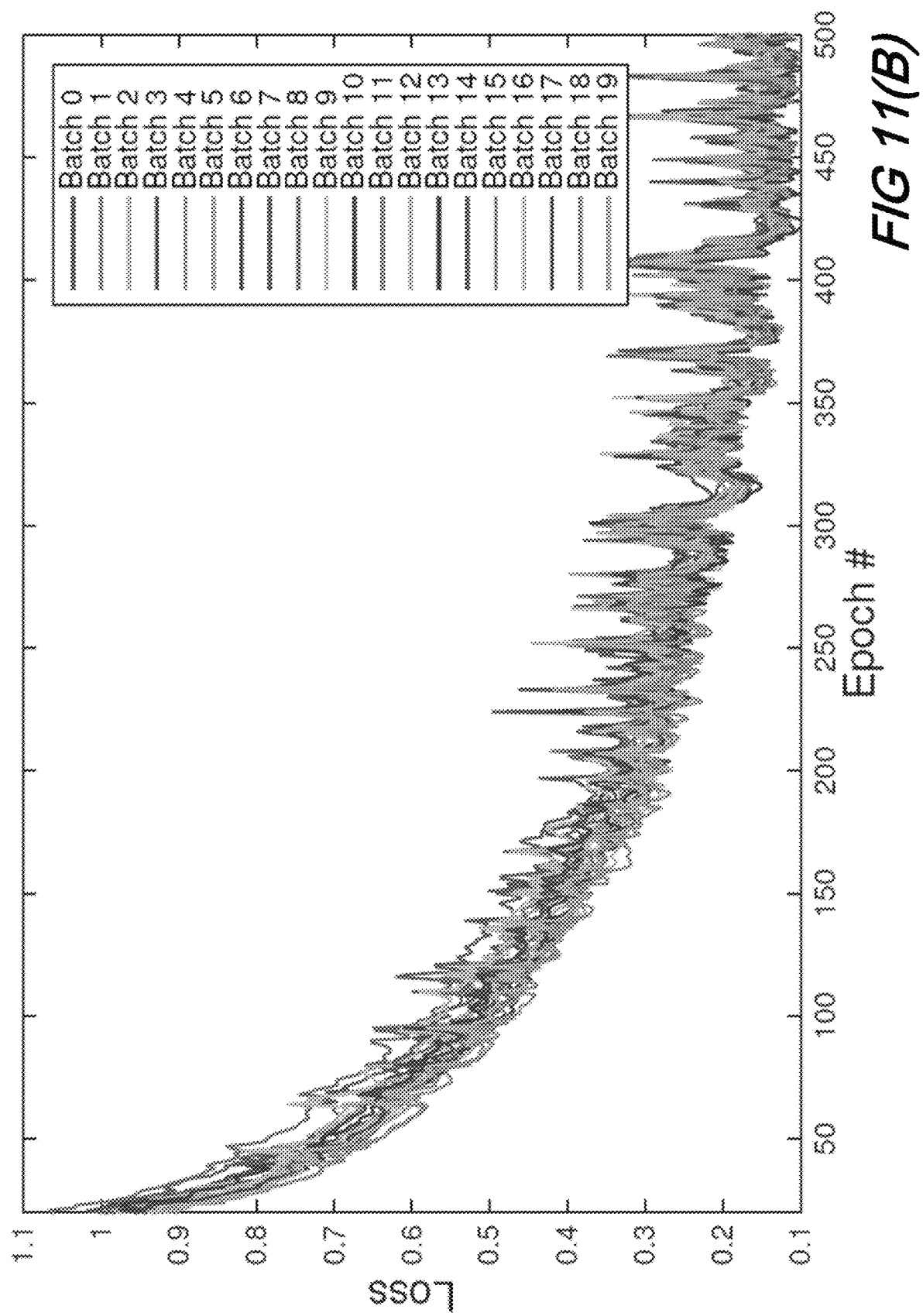

|  | HR Top/Top 5 Accuracy | | | Average Top/Top 5 Accuracy | | | Normalized Average Time to Top/Top-5 Accuracy | | |
|---|---|---|---|---|---|---|---|---|---|
|  | SGD | ISGD | IMP | SGD | ISGD | IMP | SGD | ISGD | IMP |
|  | 99.08% | 99.19% | 0.11% | 99.05% | 99.17% | 0.12% | 1 | 0.744 | 25.6% |
|  | 76.01% | 76.55% | 0.54% | 75.78% | 76.43% | 0.64% | 1 | 0.722 | 22.78% |
|  | 82.12% | 81.10% | 1.01% | 81.83% | 80.56% | 1.27% | 1 | 0.8547 | 14.53% |

FIG 15

ACCELERATING DEEP NEURAL NETWORK TRAINING WITH INCONSISTENT STOCHASTIC GRADIENT DESCENT

CROSS REFERENCE TO RELATED APPLICATIONS

This application claims the benefit of U.S. Provisional Patent Application Ser. No. 62/291,554 filed Feb. 5, 2016 which is incorporated by reference as if set forth at length herein.

TECHNICAL FIELD

This disclosure relates generally to convolutional neural networks and systems constructed therefrom. More particularly it pertains to an improved method for training convolutional neural networks employing inconsistent stochastic gradient descent.

BACKGROUND

As is known, large scale neural networks have found widespread applicability in a number of technological arts including natural language processing, video motion analysis, decision systems and drug design. Of particular importance to the performance of a neural network—is its training.

Training a large neural network saturated with nonlinearity, however, is notoriously difficult. For example, it may take 10,000 central processing unit (CPU) cores several days to complete the training of a network having one billion parameters.

Given this importance and difficulty, systems and methods that improve the efficiency of neural network training would be a welcome addition to the art.

SUMMARY

An advance in the art is made according to aspects of the present disclosure directed to techniques for training a convolutional neural network using an inconsistent stochastic gradient descent (ISGD) algorithm. Training effort for training batches used by the ISGD algorithm are dynamically adjusted according to a determined loss for a given training batch which are classified into two sub states—well-trained or under-trained.

In sharp contrast to prior art training methods the ISGD algorithm provides more iterations for under-trained batches while reducing iterations for well-trained ones. As a result, ISGD converges much faster than prior art methods, improves accuracy, and supports large batch sizes.

BRIEF DESCRIPTION OF THE DRAWING

A more complete understanding of the present disclosure may be realized by reference to the accompanying drawing in which:

FIG. 3 is a pseudocode listing of Algorithm 1—an Inconsistent Stochastic Gradient Descent method according to an aspect of the present disclosure;

FIG. 4 is a pseudocode listing of Algorithm 2—a method to solve conservative subproblem to accelerate an under-trained batch(es) according to an aspect the present disclosure;

FIG. 6(A) shows single class batches: $b_1$ randomly draw 100 images from each categories of CIFAR-10 and FIG. 6(B) shows independent identically distributed (i.i.d) batches according to an aspect of the present disclosure;

FIGS. 11(A)-11(E) are plots illustrating training on CIFAR in which: FIG. 11(A) shows ISGD loss distribution by epochs, FIG. 11(B) shows SGD loss distribution by epochs, FIG. 11(C) shows STD of the batch's loss distribution, FIG. 11(D) shows average loss of 20 batches, and FIG. 11(E) shows validation accuracy according to aspects of the present disclosure;

FIGS. 12(A)-12(F) are plots illustrating validation accuracy and training loss in which: FIG. 12(A) shows MNIST test accuracy, FIG. 12(B) shows CIFAR Test accuracy, FIG. 12(C) shows ImageNet Top 5 accuracy, FIG. 12(D) shows MNIST Train error, FIG. 12(E) shows CIFAR Train error, and FIG. 12(F) shows ImageNet Train error according to aspects of the present disclosure;

FIGS. 13(A)-13(C) are plots illustrating effect of batch size on total training time in which: FIG. 13(A) shows MNIST, FIG. 13(B) shows CIFAR, and FIG. 12(C) shows ImageNet according to aspects of the present disclosure;

FIGS. 14(A)-14(B) are plots illustrating validation accuracy and the training loss progression on ImageNet trained with the Nesterov accelerated gradient in which: FIG. 14(A) shows ImageNet Train error and FIG. 14(B) shows ImageNet top 1 accuracy according to aspects of the present disclosure; and FIG. 15 is a table illustrating performance of ISGD for a number of different scenarios.

Figure 1:
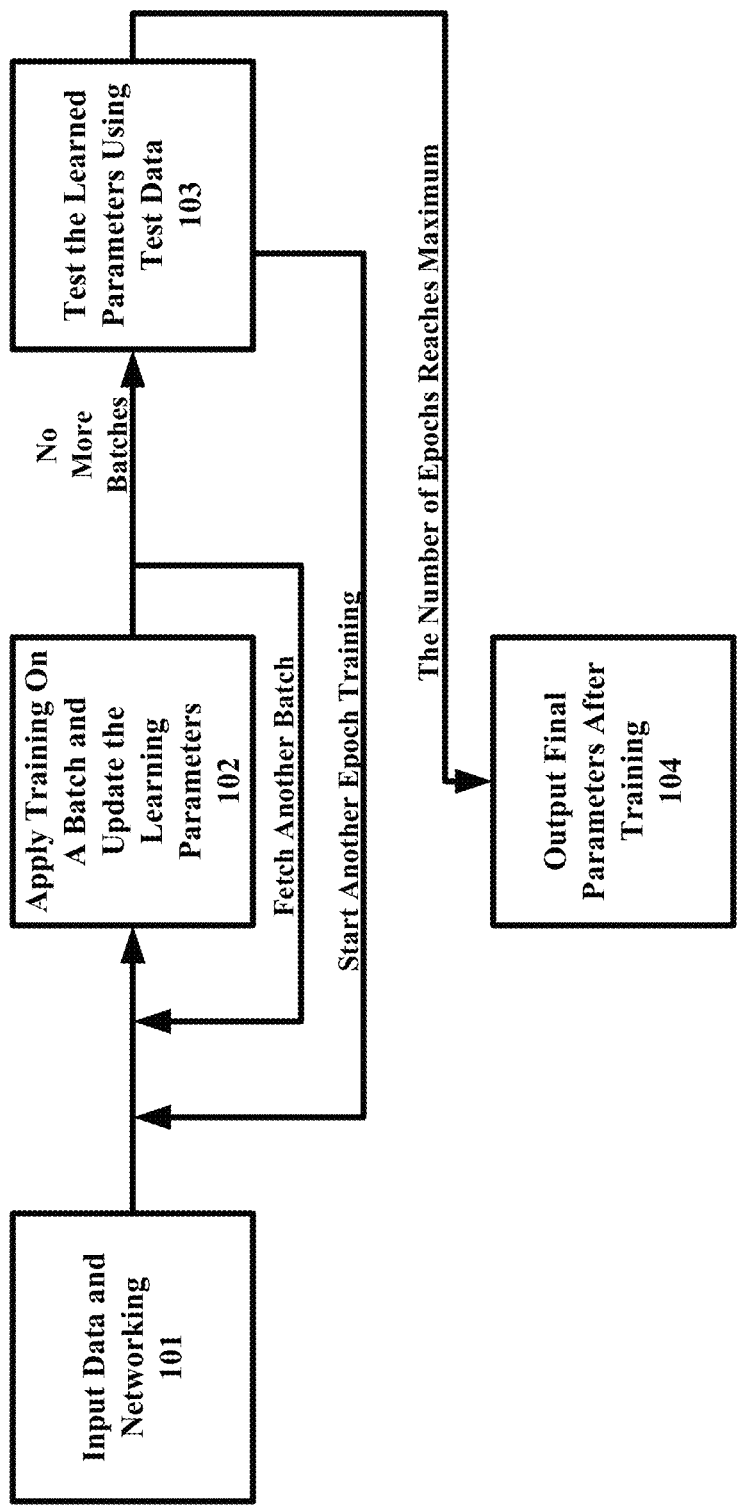
FIG. 1 is a schematic block diagram illustrating a neural network training scheme according to an aspect of the present disclosure.

The illustrative embodiments are described more fully by the Figures and detailed description. Embodiments according to this disclosure may, however, be embodied in various forms and are not limited to specific or illustrative embodiments described in the drawing and detailed description.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The functions of the various elements shown in the Drawing, including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

Unless otherwise explicitly specified herein, the FIGs comprising the drawing are not drawn to scale.

By way of some additional background, we note that computing technologies providing tera-floating-point-operations-per-second (TFLOPs) have greatly accelerated the development of Neural Networks and their application. In particular—and as previously noted—large scale neural networks have drastically improved systems associated with natural language processing, video motion analysis, decision systems and drug discovery. Notwithstanding such improvement and applicability however, training a large neural network saturated with nonlinearity remains particularly difficult. For example, it takes 10000 CPU cores up to several days to complete the training of a network with 1 billion parameters. Such computational challenges have highlighted the importance of improving the efficiency of gradient based training methods—which are widely used in the art.

As will be readily understood by those skilled in the art, neural network training is a type of optimization problem that searches for optimal parameters to approximate an intended function defined over a finite training set. A notable aspect of training is the vast solution hyperspace defined by abundant network parameters. By way of example, the recent ImageNet contests have seen a parameter size of Convolutional Neural Networks (CNN) increase to $n:10^9$. Solving an optimization problem at this scale is prohibitive to the second order optimization methods, as the required Hessian matrix, of size $10^9 \times 10^9$, is too large to be tackled by modern computer architectures. As a result, first order gradient descent is used pervasively for training large scale neural networks.

As will be further understood by those skilled in the art, the standard first order full Gradient Descent (GD) calculates the gradient with a whole dataset. Despite the appealing linear convergence rate of full gradient descent ($o(\rho^k), \rho<1$), the computation in an iteration linearly increases with the size of dataset. This makes the method unsuitable for neural networks trained with the sheer volume of labelled data.

To address this issue, a Stochastic Gradient Descent (SGD) method was developed from observing that a large amount of redundancy exists among training examples. SGD operates by approximating the dataset with a batch of random samples, and uses the stochastic gradient computed from the batch to update the model. Although the convergence rate of SGD, $o(1/\sqrt{bk}+1/k)$ where b is the batch size, is slower than GD, SGD updates the model much faster than GD in a period, i.e. larger k. As a result, the faster convergence is observable on SGD compared to GD in practice. Notably, SGD hits a "sweet spot" between good system utilization and fast gradient updates. Therefore, it has become a popular and effective method to train large scale neural networks.

One key operation in SGD is to draw a random batch from the dataset. While such an operation appears mathematically simple, it nevertheless is none-trivial to implement on a large-scale dataset such as that of ImageNet—for example. As will be readily appreciated by those skilled in the art, a state of the art engineering approximation is the Fixed Cycle Pseudo Random (FCPR) sampling (defined later in this Specification), which retrieves batches from a pre-permuted dataset like a ring, e.g. $d_0 \to d_1 \to d_2 \to d_0 \to d_1 \to \ldots$, where $d_i$ denotes a batch.

In this case, each batch receives the same training iterations as a batch updates the network exactly once in an epoch. Please note this engineering simplification allows batches to repetitively flow into the network, which is different from the random sampling in Statistics. However, it is known that the gradient variances differentiate batches in the training, and gradient updates from the large loss batch contribute more than the small loss ones.

In this Specification, we disclose a method we call Inconsistent Stochastic Gradient Descent (ISGD) to rebalance the training effort among batches. The inconsistency is reflected by uneven gradient updates on batches. ISGD measures the training status of a batch by the associated loss. At any iteration t, ISGD traces the losses in iterations $[t-n_b,t]$, where $n_b$ is the number of distinct batches in a dataset. These losses assist in constructing a dynamic upper threshold to identify an under-trained batch during the training. If a batch's loss exceeds the threshold, ISGD accelerates the training on the batch by solving a new subproblem that minimizes the discrepancy between the loss of current batch and the mean. The subproblem also contains a conservative constraint to avoid overshooting by bounding the parameter change.

One key aspect of the subproblem is to allow additional gradient updates on a under-trained batch while still remaining the proximity to the current network parameters. Empirical experiments demonstrate ISGD, especially at the final stage, performs much better than the baseline method SGD on various mainstream datasets and networks.

For practical considerations, we also explore effect of batch size on the convergence rate with other system factors considered. Enlarging the batch size expedites the convergence, but it linearly adds computations in an iteration. In the scenario involving a single node training, a small batch is favored to ensure frequent gradient updates. In the scenario involving multi-node training, it entails heavy synchronizations among nodes per iteration. The more gradient updates, the higher synchronization cost is. In this case, a moderate large batch reduces overall communications, and it also improves the system saturation and the available parallelism.

Turning now to FIG. 1 there is shown a schematic block diagram illustrating an overview of a method according to an aspect of the present disclosure. As noted above and worth repeating. SGD is widely used to train CNNs. In SGD an entire dataset is partitioned into a set of batches. SGD treats all batches identically and trains each batch iteratively in an epoch. Notably, the costs of training individual batches are quite different due—in part—to sampling bias, intrinsic image difference(s), etc. Therefore SGD is quite inefficient.

In sharp contrast, our Inconsistent Stochastic Gradient Descent (ISGD) method of the instant application dynamically varies the numbers of training iterations on batches. With ISGD, a batch is classified into two states, well-trained or under-trained. Then, ISGD spends more iterations on under-trained batches while reducing iterations for well-trained batches.

Notably, ISGD converges much more quickly than SGD. Furthermore, ISGD improves accuracy as ISGD applies more training on under-trained batches. Finally, ISGD supports large batch sizes, which as we shall show—is quite useful on multiGPU systems.

Returning to FIG. 1, it may be observed that at Block 101, image data and a network to be trained are input. A maximum number of training epochs are specified and then in blocks 102 and 103, this maximum number of training epochs are completed.

At this point it is useful to define a number of terms as those terms are used herein. As is known and as used herein, an epoch is one forward pass and one backward pass of all the training examples. A batch size is the number of training examples in one forward/backward pass. The larger the batch size, the more memory is required. Finally, an iteration is a pass, and a number of iterations is the number of passes. Each pass using [batch size] number of examples. To be clear, one pass is one forward pass and one backward pass. The forward and backward passes are not counted independently.

As the training progresses, the training is applied on a batch and appropriate learning parameters are updated. Upon completion, another batch is fetched and training is applied on that batch as well. This process continues until there are no more batches to process.

At block 103, the learned parameters are tested using test data and this overall process is repeated until the number of epochs reaches the maximum. At block 104, the output parameters are output after training.

Figure 2:
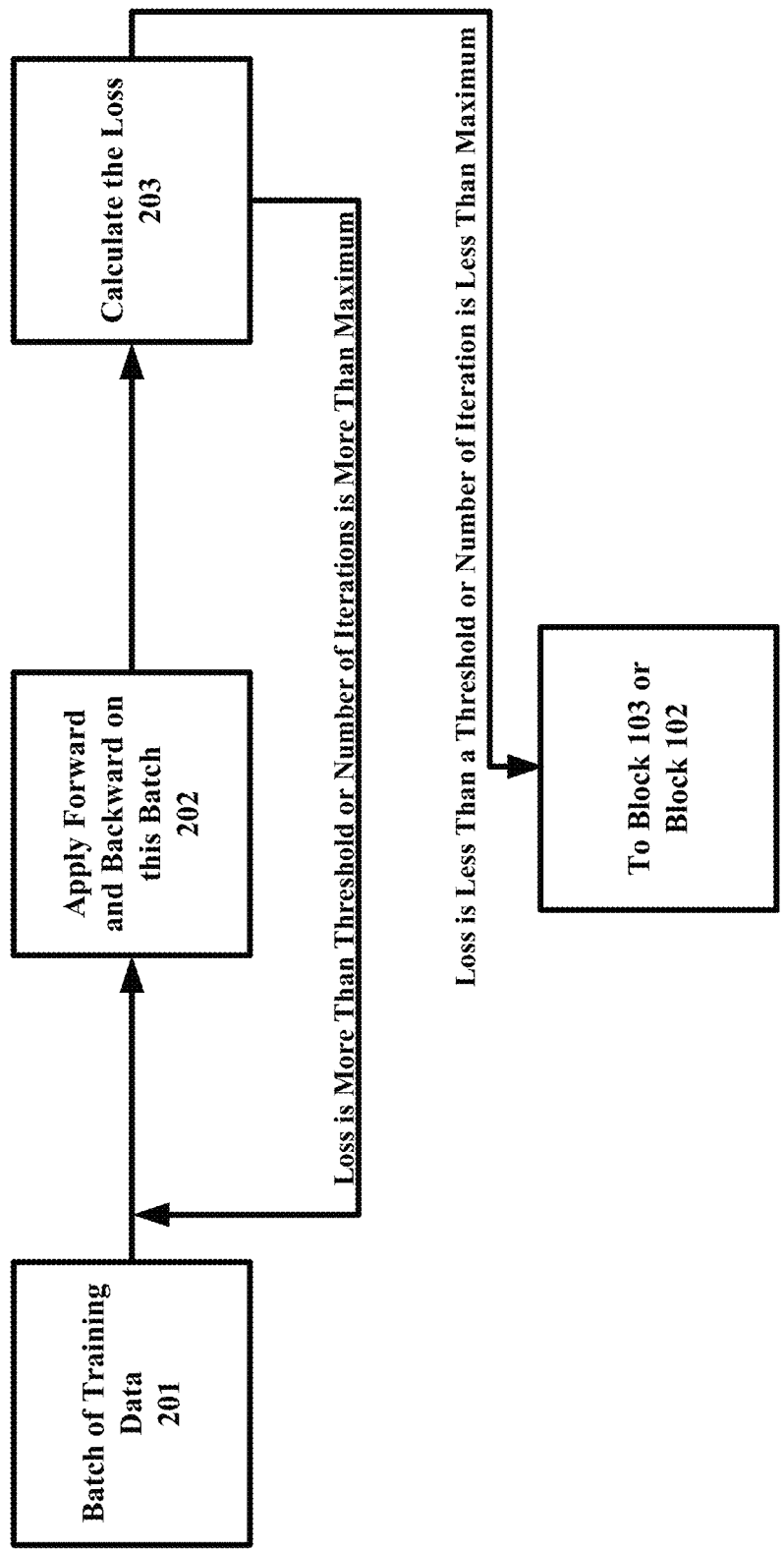
FIG. 2 is a schematic block diagram illustrating a training on a batch and updating learning parameters according to an aspect of the present disclosure.

While FIG. 1 provides an overview of CNN training according to the present disclosure, FIG. 2 is a schematic block diagram providing more detail into the operations of Block 102, shown in FIG. 1. With continued reference to FIG. 2, it may be observed that at block 201, a batch of training data is input. At block 202, forward and backward training is applied on the input training batch. A loss is determined at block 203, and if the loss value exceeds a threshold or a maximum number of iterations is more than a maximum, training on this batch is continued (Block 202). If the loss value is less than a threshold or the number of iterations is less than a maximum number, then a return to the overall process of FIG. 1 (block 103/102) continues.

Worth noting at this point is that ISGD is able to identify an under-trained batch based on loss information and then apply more training on under-trained batch to allow it to chase the well-trained batch(es) such that all batches exhibit a similar training speed.

Figure 5:
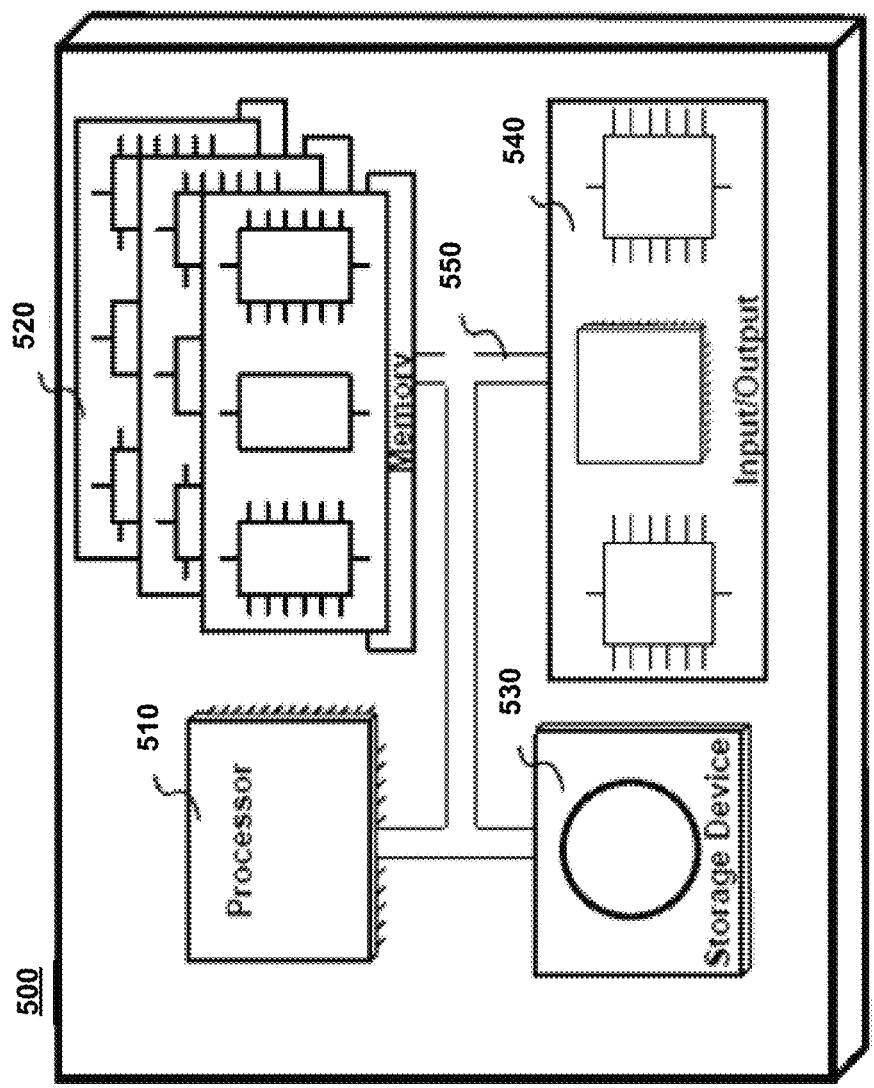
FIG. 5 is a schematic block diagram of an illustrative computer system on which methods of the present disclosure may operate according to an aspect of the present disclosure.

FIG. 3 is a pseudocode listing of Algorithm 1—an Inconsistent Stochastic Gradient Descent method according to an aspect of the present disclosure while FIG. 4 is a pseudocode listing of Algorithm 2—a method to solve conservative subproblem to accelerate an under-trained batch(es). As will be readily appreciated by those skilled in the art, such algorithms as part of methods according to the present disclosure may advantageously be programmed to execute on any of a variety of computing systems—including—and advantageously—multiprocessors. FIG. 5 is a schematic block diagram of an illustrative computer system on which methods of the present disclosure may operate.

As may be immediately appreciated, such a computer system may be integrated into another system and may be implemented via discrete elements or one or more integrated components. The computer system may comprise, for example a computer running any of a number of operating systems. The above-described methods of the present disclosure may be implemented on the computer system 500 as stored program control instructions.

Computer system 500 includes processor(s) 510, memory 520, storage device 530, and input/output structure 540. One or more busses 550 typically interconnect the components, 510, 520, 530, and 540. Processor 510 may be a single or multi core and. Additionally, the system may include multiple processors including multiple cores, accelerators etc. Still further, large scale systems of such multiple core, multi-processor systems 500 may be constructed to further enhance any parallelism desired.

Processor 510 executes instructions in which embodiments of the present disclosure may comprise steps described in one or more of the Drawing figures. Such instructions may be stored in memory 520 or storage device 530. Data and/or information may be received and output using one or more input/output devices.

Memory 520 may store data and may be a computer-readable medium, such as volatile or non-volatile memory. Storage device 530 may provide storage for system 500 including for example, the previously described methods. In various aspects, storage device 530 may be a flash memory device, a disk drive, an optical disk device, or a tape device employing magnetic, optical, or other recording technologies.

Input/output structures 540 may provide input/output operations to other systems/structures to which system 500 is communicatively coupled.

Related Work

A variety of approaches have been proposed to improve "vanilla" SGD for neural network training. Accordingly, while describing the prior art approaches we further describe how our inconsistent training method of the instant application is fundamentally different from these prior-art, existing methods.

As is known, the stochastic sampling in SGD introduces a gradient variance, which slows down convergence rate. Consequently, researchers have attempted to apply various variance reduction techniques on SGD to improve the convergence rate.

Stochastic Variance Reduced Gradient (SVRG) keeps network historical parameters and gradients to explicitly reduce the variance of update rule, however SVRG only works well for the fine-tuning of non-convex neural network. Other approaches have explored control variates on SGD, while still others have explored importance sampling. These variance reduction techniques, however, are rarely used in the large scale neural networks, as they consume the huge RAM space to store the intermediate variables.

In sharp contrast to these prior-art approaches, ISGD— which is the subject of the present disclosure—adjusts to the negative effect of gradient variances, and it does not construct auxiliary variables. Consequently and advantageously, ISGD is much more memory efficient and practical than prior-art, variance reduction methods.

Momentum is a widely recognized heuristic to boost SGD. SGD oscillates across the narrow ravine as the gradient always points to the other side instead of along the ravine toward the optimal. As a result, Momentum tends to bounce around leading to a slow convergence. Momentum damps oscillations in directions of high curvature by combining gradients with opposite signs, and it builds up speed toward a direction that is consistent with the previously accumulated gradients. Those skilled in the art will appreciate that the update rule of Nesterov's accelerated gradient is similar to Momentum, but the minor different update mechanism for building the velocity results in important behavior differences. Momentum strikes in the direction of the accumulated gradient plus the current gradient. In contrast, Nesterov's accelerated gradient strikes along the previous accumulated gradient, then it measures the gradient before making a correction. This prevents the update from descending fast, thereby increases the responsiveness.

Advantageously, ISGD is fundamentally different from these approaches in that it considers the training dynamics on batches. ISGD rebalances the training effort across batches, while Momentum and Nesterov's accelerated gradient leverage the noted curvature "tricks". Accordingly— and of further advantage—inconsistent training is expected to be compatible with both methods.

Adagrad is a method that adapts learning rate to the parameters, performing larger updates for infrequent parameters, and smaller updates for frequent parameters. It accumulates the squared gradients in the denominator, which will drastically shrink the learning rate. Subsequently, RMSprop and Adadelta have been developed to resolve the issue. These adaptive learning rate approaches adjust the extent of parameter updates w.r.t the parameter's update frequency to increase the robustness of training, while ISGD adjusts the frequency of a batch's gradient updates w.r.t the loss to improve the training efficiency. From this perspective, ISGD is markedly different from the adaptive learning rate approaches.

As this disclosure will make readily apparent to those skolled in the art, inconsistent training according to the present disclosure spares more training effort on the large loss batches than the small loss ones. One motivating rational is that gradient updates from the small loss batches contribute less than large loss ones. Similarly, Simo-Serra et al have adopted a similar idea in training the Siamese network to learn deep descriptors by intentionally feeding the network with hard training pairs, i.e. pairs yield large losses, and such method is proven to be an effective way to improve the performance. And while they manually pick the hard pairs to feed the network, ISGD automatically identifies the hard batch during the training. In addition, the mechanism of ISGD's hard batch acceleration is markedly different from the Simo-Serra method. ISGD solves a sub-optimization problem on the hard batch to reduce the batch's loss and advantageously avoids drastic parameter changes, while the Simo-Serra's method simply feeds the batch more often. Note that it is important to bound the parameter changes, because overshooting a batch leads to the divergence on other batches. Accordingly, and as will become appreciated by those skilled in the art, the ISGD method according to the present disclosure is the first neural network solver to consider batch-wise training dynamics, and consequently has demonstrated surprising performance improvements on a variety of real world datasets and models.

Problem Statement

This section demonstrates the non-uniform batch-wise training dynamics. Theoretically, we prove the contribution of gradient updates varies among batches based on the analysis of SGD's convergence rate. We also hypothesize that Intrinsic Image Differences and Sampling Bias are high level factors to the phenomenon, and the hypothesis is verified by two controlled experiments. Both theories and experiments support our conclusion that the contribution of a batch's gradient update is different.

Then we demonstrate the Fixed Cycle Pseudo Random sampling employed by SGD is inefficient to handle this issue. In particular, the consistent gradient updates on all batches, regardless of their statuses, is wasteful especially at the end of training, and the gradient updates on the small loss batch could have been used to accelerate large loss batches.

A Recap of CNN Training

We formulate the CNN training as the following optimization problem. Let $\psi$ be a loss function with weight vector w as function parameters, which takes a batch of images d as the input. The objective of CNN training is to find a solution to the following optimization problem:

$$\min_w \psi_w(d) + \frac{1}{2}\lambda P w P_2^2 \tag{1}$$

The second term is Weight Decay, and $\lambda$ is a parameter to adjust its contribution (normally around $10^{-4}$). The purpose of Weight Decay is to penalize the large parameters so that static noise and irrelevant components of weight vectors get suppressed.

A typical training iteration of CNN consists of a Forward and Backward pass. The forward pass yields a loss that measures the discrepancy between the current predictions and the truth. The backward pass calculates the gradient, the negative of which points to the steepest descent direction. Gradient Descent updates the w as follows:

$$w^t = w^{t-1} - \eta_t \nabla \psi_w(d) \tag{2}$$

Evaluating the gradient over the entire dataset is extremely expensive especially for large datasets such as ImageNet. To resolve this issue, mini-batched SGD is proposed to approximate the entire dataset with a small randomly drawn sample $d_r$. The upside of mini-batched SGD is the efficiency of evaluating a small sample in the gradient calculation, while the downside is the stochastic gradient slowing down the convergence.

Let's define a sample space $\Omega$. If $\psi_w(d_t)$ is a random variable defined on a probability space $(\Omega, \Sigma, P)$, the new objective function is $$\min_w E\{\psi_w(d_t)\} = \int_\Omega \psi_w(d_t) dP + \frac{1}{2}\lambda P w P_2^2 \quad (3)$$

the update rule changes to $$w^t = w^{t-1} - \eta_t \nabla \psi_w(d_{t-1}) \quad (4)$$

and the following holds, $$E\{\nabla \psi_w(d_t)\} = \nabla \psi_w(d) \quad (5)$$

Measure Training Status with Cross Entropy Error

We use the loss to reflect the training status of a batch. A convolutional neural network is a function of $R^n \to R$, the last layer of which is a softmax loss function calculating the cross entropy between the true prediction probabilities $p(x)$ and the estimated prediction probabilities $\hat{p}(x)$. The definition of softmax loss function of a batch at iteration t is $$\psi_{w_t}(d_t) = -\sum_i^{n_b} \sum_x p(x) \log \hat{p}(x) + \frac{1}{2}\lambda P w P_2^2 \quad (6)$$

where $n_b$ is the number of images in a batch, and $\lambda$ regulates Weight Decay. Since Weight Decay is applied, the loss of a batch fluctuates around a small number after being fully trained.

The loss produced by the cross entropy is a reliable indicator of a batch's training status. Given a batch $d_t$, the cross entropy $\psi_{w_t}(d_t)$ measures the discrepancy between the estimated probabilities and the truth. In the image classification task, the truth $p(x)$ is a normalized possibility vector, containing most zeros with only one scalar set to 1. The index of the vector corresponds to an object category. For example, $p(x)=[0,0,1,0,0]$ indicates the object belongs the category 2 (index starts from 0). The neural network produces an normalized estimate possibility $\hat{p}(x)$, and the loss function only captures the extent of making the correct prediction as the zeros in $p(x)$ offset the incorrect predictions in $\hat{p}(x)$. If $\hat{p}(x)$ is close to $p(x)$, the loss function yields a small value. If $\hat{p}(x)$ is far from $p(x)$, the loss function yields a large value. Therefore, we use the loss of a batch to assess the model's training status on it. Intuitively a large loss indicates that most predictions made by the network on the batch are false, and the additional training on the batch is necessary.

Motivation: Non-uniform Training Dynamics of Batches

The gradient variance is the source of batch-wise training variations. The benefit of using a random sample to approximate the population is the significantly less computations in an iteration, while the downside is the noisy gradient. Please note the convergence rate in this section is measured by iterations. To analyze the training dynamics per iteration, we need define the Lyapunov process:

$$h_t = P w^t - w^* P_2^2 \quad (7)$$

The equation measures the distance between the current solution $w^t$ and the optimal solution $w^*$. $h_t$ is a random variable. Hence the convergence rate of SGD can be derived using Eq. 4 and Eq. 7:

$$h_{t+1} - h_t = P w^{t+1} - w^* P_2^2 - P w^t - w^* P_2^2 \quad (8)$$
$$= (w^{t+1} + w^t - 2w^*)(w^{t+1} - w^t)$$
$$= (2w^t - 2w^* - \eta_t \nabla \psi_w(d_t))(-\eta_t \nabla \psi_w(d_t))$$
$$= -2\eta_t(w^t - w^*)\nabla \psi_w(d_t) + \eta_t^2 (\nabla \psi_w(d_t))^2$$

where $d_t$ is a random sample of d in the sample space $\Omega$, and $h_{t+1} - h_t$ is a random variable that depends on the drawn sample $d_t$ and learning rate $\eta_t$. It suggests how far an iteration step toward $w^*$. This equation demonstrates two important insights:

Reducing VAR$\{\nabla \nabla \psi_w(d_t)\}$ improves the convergence rate. The expectation of Eq. 8 yields the average convergence rate at the precision of an iteration.

$$E\{h_{t+1} - h_t\} = -2\eta_t(w^t - w^*)E\{\nabla \psi_w(d_t)\} + \quad (9)$$
$$\eta_t^2 E\{(\nabla \psi_w(d_t))^2\}$$
$$= -2\eta_t(w^t - w^*)E\{\nabla \psi_w(d_t)\} +$$
$$\eta_t^2 (E\{\nabla \psi_w(d_t)\})^2 + \text{VAR}\{\nabla \psi_w(d_t)\}$$

To simplify the analysis of Eq. 9, let's assume the convexity on $\psi_w(d_t)$ implying that $$h_{t+1} - h_t < 0 \quad (10)$$

$$-(w^t - w^*)E\{\nabla \psi_w(d_t)\} < 0. \quad (11)$$

where $E\{\nabla \psi_w(d_t)\}$ is the unbiased estimate of $E\{\nabla \psi_w(d)\}$. Therefore, maximizing the contribution of an iteration is reduced to the minimization of VAR$\{\nabla \psi_w(d_t)\}$. This direction has been well addressed.

The contribution of an iteration, $h_{t-1} - h_t$, varies with respect to $d_t$. According to Eq. 8, the variance of $h_{t+1} - h_t$ is:

$$\text{VAR}\{h_{t+1} - h_t\} = 4\eta_t^2(w^t - w^*)^2 \text{VAR}\{\nabla \psi_w(d_t)\} + \quad (12)$$
$$\eta_t^4 \text{VAR}\{(\nabla \psi_w(d_t))^2\} - 2\eta_t^3(w_t - w_*)\text{COV}\{\nabla \psi_w(d_t), \nabla \psi_w(d_t)^2\}$$

The equation demonstrates VAR$\{h_{t+1} - h_t\} \neq 0$, which implies the contribution of gradient updates is non-uniform. It is interesting to notice that the determining factors in this equation, $\nabla \psi_w(d_t)^2$ and $\nabla \psi_w(d_t)$, is contingent upon $d_t$, suggesting a correlation between $h_{t+1} - h_t$ and $d_t$. This unique insight motivates us to understand what factors in $d_t$ affect the convergence rate $h_{t+1} - h_t$, and how to address the load balancing problem in the training. Although there are extensive studies toward the variance reduction on $\nabla \psi_w(d_t)$, few explores this direction. Let's use the loss of a batch to measure the model's training status on it. FIG. 6 illustrates the loss traces of 10 separate batches during the training. It is observable that the losses of batches degenerate at different rates. Therefore, the empirical observations and Eq. 12 prompt us to conclude that the contribution of a batch's gradient update is non-uniform.

This also explains the distinctive training dynamics of batches in FIG. 6. Eq. 12 suggests $d_t$ is critical for the claim. We conduct a set of empirical evaluations to understand how $d_t$ affect VAR$\{h_{t+1} - h_t\}$, and we propose two high level factors, Sampling Bias and Intrinsic Image Difference, to explain the phenomenon. The definitions of these two terms are as follows:

Sampling Bias: It is a bias in which a sample is collected in such a way that some members of the intended population are less likely to be included than others.

Intrinsic Image Difference: Intrinsic Image Difference indicates images from the same subpopulation are also different at pixels. For example, the category 'cat' can contain some white cat pictures or black cat pictures. Though black cat and white cat belong to the cat subpopulation, they are still different at pixels.

Sampling Bias is the first factor to explain the training variations on batches. We consider two kinds of Sampling Bias. First, existing datasets, such as Places or ImageNet, contain uneven number of images in each category. As a result, the dominate sub-population is more likely to be selected in a batch than others. Second, the insufficient shuffling on the dataset may lead to clusters of subpopulations. When SGD sequentially draws images from the insufficient permuted dataset to form a randomized batch, one subpopulation is more likely to be included than others. In both cases, they conform to the definition of Sampling Bias. For example, the chance of sampling 1 from [1, 1, 1, 0, 2, 3] is higher than the rest. To support the claim, we synthesized 10 single-class batches randomly drawn from an exclusive image category in CIFAR-10.

Figure 6A:
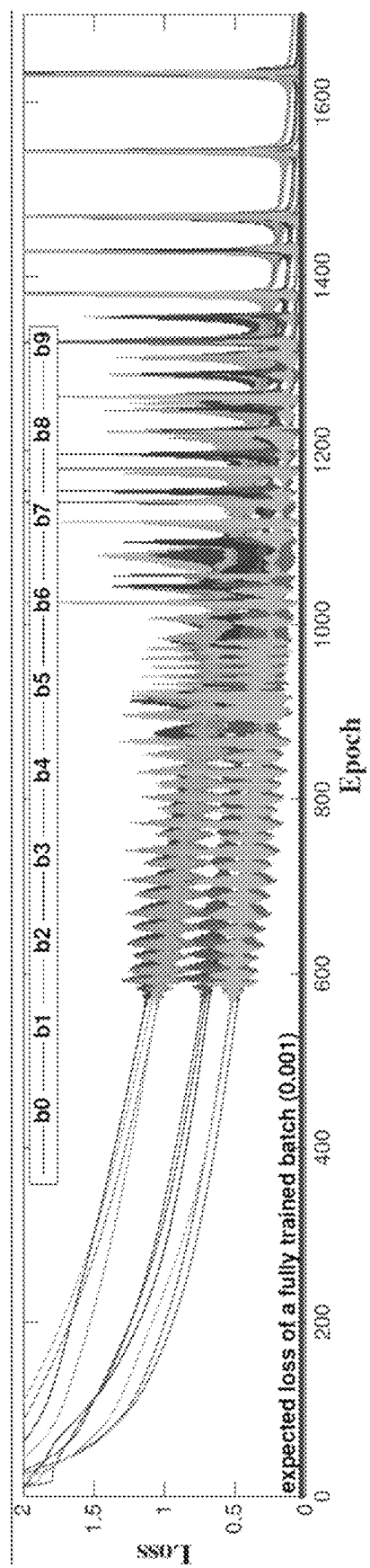
FIGS. 6(A)-6(B) are plots of loss traces of 10 single class and i.i.d. batches in two controlled experiments where

Note that CIFAR-10 contains 10 independent image categories. Each batch represents a unique CIFAR-10 category, and they are highly polluted with Sampling Bias as each batch only contains one subpopulation. FIG. 6(A) illustrates the loss traces of ten single-class batches. It is obvious to see the losses of ten batches degrade independently. In particular, gradient updates from the yellow batch is more effective than the purple batch. Therefore, these results justify our claim about Sampling Bias and the batch-wise training variation.

Figure 6B:
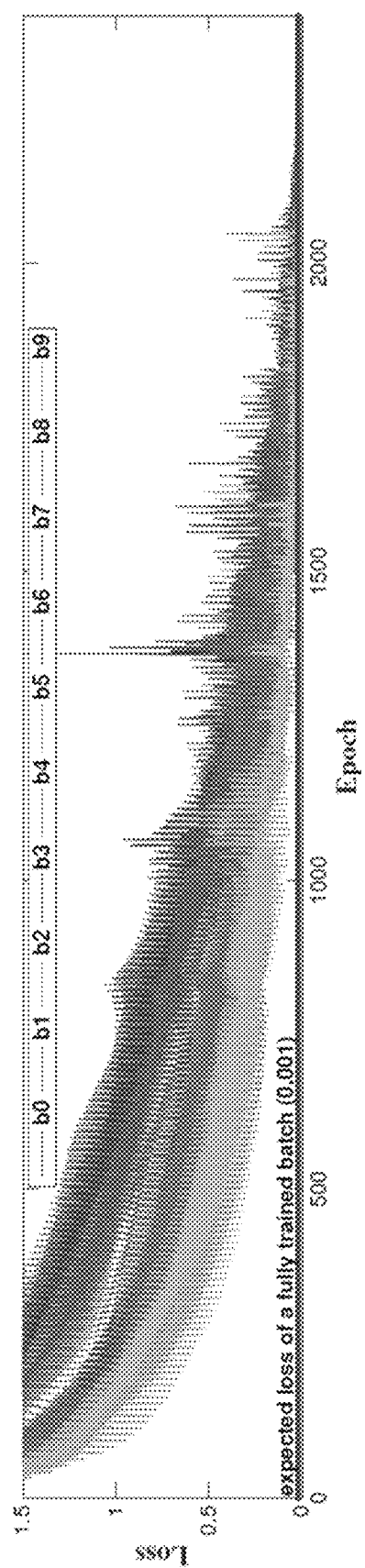

Intrinsic Image Difference is the second factor to explain the training variations on batches. To substantiate this point, we conduct a controlled experiment on 10 independent identically distributed batches. A batch includes 1000 images, and each batch contains 100 randomly drawn images from category 0, 100 images from category 1, . . . , 100 images from category 9. This sequence is fixed across batches to eliminate the potential ordering influence. In this case, each batch contains the same number of images from 10 subpopulations in CIFAR-10 and the only difference among them is the pixels. Hence, we consider these batches independent identically distributed. The network is same as the one used in Sampling Bias. FIG. 6(B) illustrates the loss traces of 10 i.i.d batches. Although a strong correlation persists through the training, it is still clear the losses of i.i.d batches degrade at separate rates. Particularly, the loss of batch 4 (green) is around 0.5 while batch 3 (purple) is around 1.3 at the epoch 400. Please note these batches are i.i.d, and they are supposed to be approximately identical to the original dataset. However, the training variations still exist indicating the non-uniform contribution of gradient updates from each batches.

Problems of Consistent Training in SGD

SGD relies on a key operation, uniformly drawing a batch from the entire dataset. It is simple in math but nontrivial in the system implementation. ImageNet, ILSVRC2012 for example, contains 1431167 256×256 high resolution RGB images accounting for approximately 256 GB in total size. Uniformly drawing a random batch from the 256 GB binary file involves significant overhead such as TLB misses or random Disk I/O operations. In addition, the drastic speed gap between Processor and Disk further deteriorates the issue. Existing deep learning frameworks, such as Caffe or Torch, alleviates the issue by pre-permuting the entire dataset before slicing into batches: $Permute\{d\} \rightarrow d = \{d_0, d_1, \ldots, d_{n-1}, d_n\} = \Omega$. During the training, each iteration fetches a batch from the permuted dataset $\Omega$ in a sequential manner $d_0 \rightarrow d_1 \rightarrow \ldots \rightarrow d_n$; and restart fetching from the beginning $d_0$ after $d_n$, creating a fixed circle batch retrieval pattern. We refer to this sampling method as Fixed Circle Pseudo Random Sampling. The random reads are subsequently reduced to sequential reads on Disk. Therefore, FCPR Sampling is widely adopted by SGD. Let $n_d$ to be the size of a dataset and $n_b$ to be the batch size. The size of sample space is $n_d/n_b$, and the batch being assigned to iteration j is $d_t$, where $$t = j \bmod^* \frac{n_d}{n_b}$$

At any iteration, the model always anticipate a fixed batch, as the batch will flow into the model at iteration t+1·epoch, . . . , t +n·epoch. If the training of a batch is dominated by the gradient update on itself, the loss of this batch is predominately reduced at iteration t,t+1*epoch,t+2*epoch, . . . , t+n*epoch. Since the contribution from a batch's gradient update is different, the repetitive batch retrieval pattern fosters the batches' distinctive training speeds. However, the FCPR sampling in SGD treats batches identically.

The problem of FCPR sampling is the consistent gradient updates on batches regardless of the model's training status. It is inefficient to update a small loss batch as frequently as a large loss batch. FIG. 6(B) illustrates the yellow batch are fully trained after the epoch 1600, while the blue batch does not until the epoch 2100. During epochs [1600, 2100], the yellow batch stays fully trained most of time indicating unnecessary training iterations on it. Besides, we also verify that the contribution of a batch's gradient update is different. Therefore, regulating the training iterations w.r.t the model's training status on batches will improve the efficiency of SGD.

Inconsistent Stochastic Gradient Descent

In this section, we present Inconsistent Stochastic Gradient Descent according to the present disclosure which advantageously rebalances the training effort w.r.t a batch's training status. The inconsistency is reflected by the non-uniform gradient updates on batches. The first question is how to dynamically identify a slow or under-trained batch during the training. We model the training as a stochastic process, and apply the upper control limit to dynamically identify a under-trained batch. The second question is how to accelerate a under-trained batch. We propose a new optimization to be solved on the batch, the objective of which is to accelerate the training without drastic parameters changes. For practical considerations, we also study the effects of ISGD batch size on the convergence rate, system saturations and synchronization cost.

Identifying Under-Trained Batch

ISGD models the training as a stochastic process that slowly reduces down the average loss of batches. We assume the normal distribution on the batch's loss in an epoch. The reasons are that: 1) SGD demands a small learning rate (lr) to converge, and lr is usually less than $10^{-1}$. lr determines the step length, while the normalized gradient determines the step direction. The small value of lr limits the contribution made by a gradient update, thus the training process is to gradually reduce down the loss toward a local optimal. 2)

Figure 7:
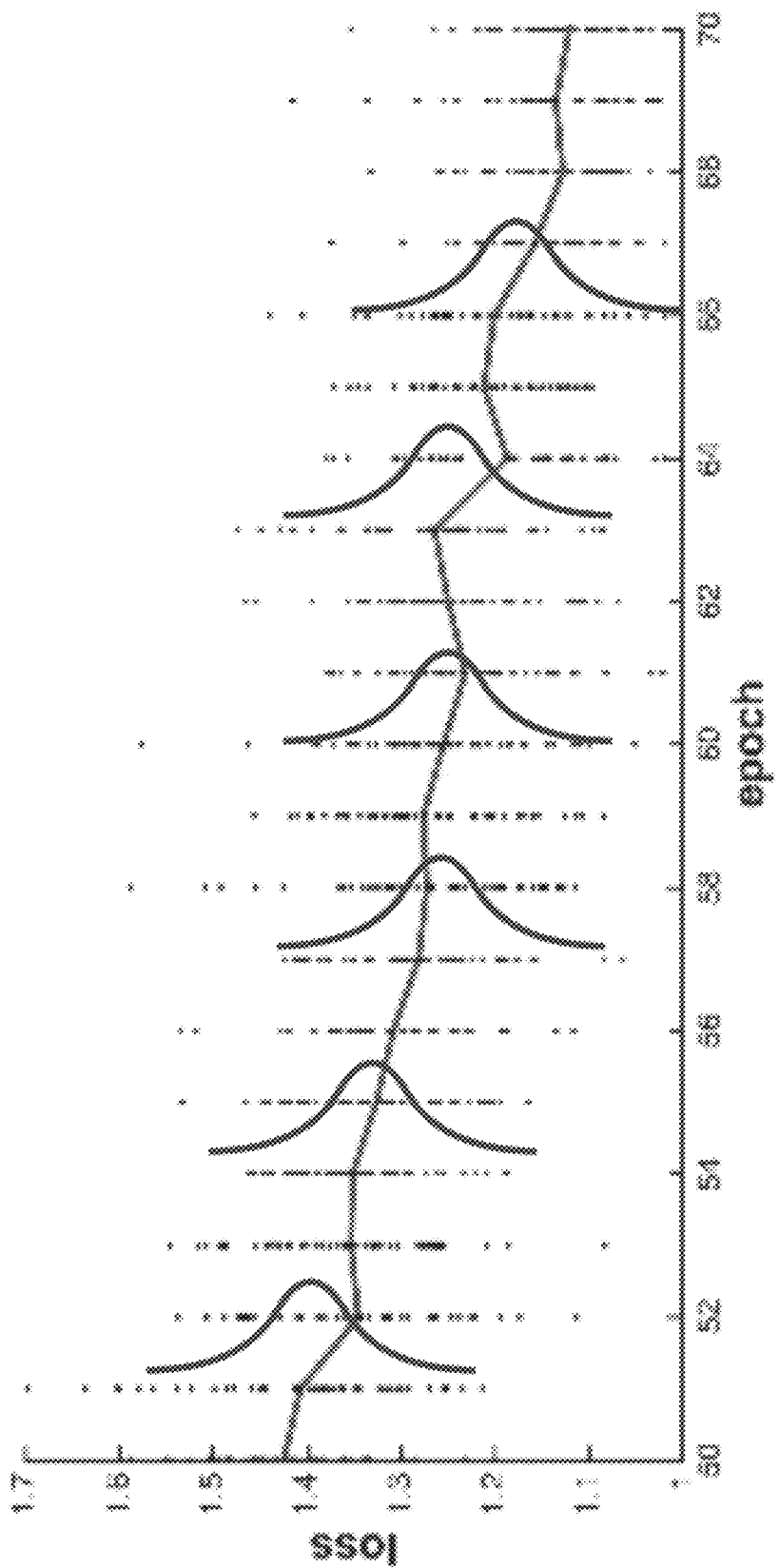
FIG. 7 is a plot illustrating loss distribution of training a network on CIFAR-10, in which the losses are arranged by epochs according to aspects of the present disclosure.

Each batch represents the original dataset, and there exists a strong correlation among batches in the training. This implies that the loss of a batch will not be drastically different from the average at any iteration. FIG. 7 illustrates the loss distribution of training a network on CIFAR-10, in which the losses are arranged by epochs. From the figure, it is valid to assume the normal distribution on the loss in an epoch. Therefore, we conclude that the training is a stochastic process that slowly decreases the mean of losses while the network converges.

The 3σ control limit is an effective method to monitor the abnormalities in a statistical process. Since we treat the training as a process that decreases the average loss of batches, ISGD utilizes the upper control limit to dynamically identify abnormal large-loss batches on the fly. To get the limit, ISGD calculates two important descriptive statistics, the running average loss $\bar{\psi}$ and the running standard deviation $\sigma_\psi$, during the training. ISGD keeps a queue to store the losses produced by iterations in $[t-n_b,t]$, where $n_b$ is the size of sample space (or the number of batches in an epoch). The queue functions as a moving window tracking the loss information in the previous epoch to yield $\bar{\psi}$ and $\sigma_\psi$.

$$\bar{\psi} = \frac{1}{n_b} \sum_{i=1}^{n_b} \psi_{w_{t-i}}(d_{t-i}) \tag{13}$$

$$\sigma_\psi = \sqrt{\frac{1}{n_b} \sum_{i=1}^{n_b} [\psi_{w_{t-i}}(d_{t-i}) - \bar{\psi}]^2} \tag{14}$$

Since the queue length is fixed at $n_b$ and the loss of a batch is a float number, the calculations of $\bar{\psi}$ and $\sigma_\psi$, and the memory cost for the queue are o(1) at any iteration t. Therefore, ISGD is much more memory efficient than the variance reduction approaches that require intermediate variables of the same size as the network parameters. With $\bar{\psi}$ and $\sigma_{104}$, the upper control limit is $$\text{limit} = \bar{\psi} + 3\sigma_\psi \tag{15}$$

In this case, we adopt the 3σ control limit. The multiplier before the $\sigma_\psi$ plays an important role in between the exploration of new batches and the exploitation of the current batch. Please refer to the discussion of 1 later for more discussion. If the loss of current iteration t is $$\psi_{w_{t-1}}(d_t) > \text{limit} \tag{16}$$

we consider $d_t$ as a under-trained batch.

Figure 8:
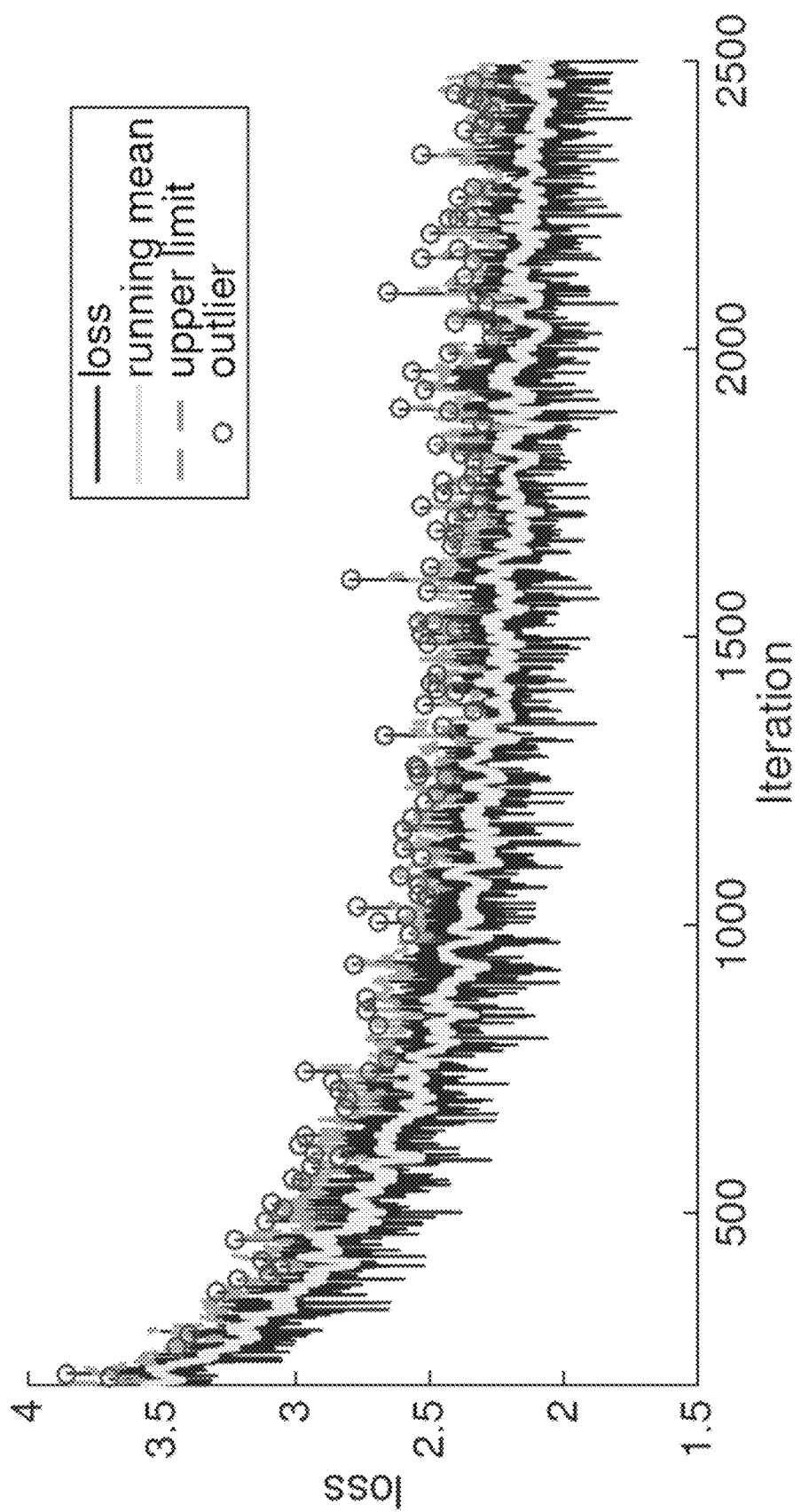
FIG. 8 is a plot illustrating identification of an under-trained batch on the fly according to aspects of the present disclosure.

FIG. 8 illustrates an example of the ISGD method to identify a under-trained batch on the fly. The blue line is the loss of batch, and the yellow line is the running average $\bar{\psi}$. The green line is the upper control limit, and the red dots are outliers considered as under-trained. The experiment is conducted with AlexNet on ImageNet, and it is clear that ISGD successfully identifies the large-loss batches in the training with the proposed approach.

Inconsistent Training

As noted previously, a core concept of the training model according to the present disclosure is to spend more iterations on the large-loss batches than the small-loss ones. The batch retrieval pattern in ISGD is similar to FCPR sampling but with the following important difference. Once a batch is identified as under-trained, ISGD stays on the batch to solve a new sub-optimization problem to accelerate the training, and the batch receives additional training iterations inside the sub-problem. In this case, ISGD does not compromise the system efficiency of FCPR sampling, while it still regulates the training effort across the batches. The new subproblem is $$\min_w \varphi_w(d_t) = \frac{1}{2} \|\psi_w(d_t) - \text{limit}\|_2^2 + \frac{\varepsilon}{2n_w} \|w - w_{t-1}\|_2^2 \tag{17}$$

where $n_w$ is the number of weight parameters in the network and ε is a parameter for the second term. The first term minimizes the difference between the loss of current undertrained batch $d_t$ and the control limit. This is to achieve the acceleration effect. The second term is a conservative constraint to avoid drastic parameter changes. Please note the second term is critical because overshooting a batch negatively affects the training on other batches. The parameter ε adjusts the conservative constraint, and it is recommended to be $10^{-1}$. The derivative of Eq. 17 is:

$$\nabla \phi_w(d_t) = [\psi_w(d_t) - \text{limit}] \nabla \psi_w(d_t) + \frac{\varepsilon(w - w_{t-1})}{n_w} \tag{18}$$

Please note limit, $w_{t-1}$ and $d_t$ are constants. Solving Eq. 17 precisely incurs the significant computation and communication overhead, which offsets the benefit of it. In practice, we approximate the solution to the new subproblem, Eq. 17, with the early stopping. This avoids the huge searching time wasted on hovering around the optimal solution. A few iterations, 5 for example, are good enough to achieve the acceleration effects. Therefore, we recommend approximating the solution by the early stopping.

Algorithm 1 shown in FIG. 3 illustrates the basic procedures of ISGD. Since the training status of a batch is measured by the loss, ISGD identifies a batch as undertrained if the loss is larger than the control limit $\bar{\psi}+3*\sigma_\psi$(Line 20). A stringent limit triggers Eq. 17 more frequently. This increases exploitation of a batch, but it also decreases the exploration of batches to a network in the fixed time. Therefore, a tight limit is also not desired. A soft margin, 2 or 3$\sigma_\psi$, is preferred in practice; and this margin is also widely applied in Statistical Process Control to detect abnormalities in a process. We recommend users adjusting the margin according to the specific problem. ISGD adopts a loss queue to dynamically track the losses in an epoch so that the average loss, $\bar{\psi}$, is calculated in o(1) (line 17). The loss queue tracks iterations in the previous epoch; the length of it equals to the length of an epoch. Similiarly, calculating $\sigma_\psi$ is also in o(1) time (line 18). We do not initiate Algorithm 2 until the first epoch to build up a reliable limit (line 22 the condition of iter>n).

Algorithm 2 shown in FIG. 4 outlines the procedures to solve the conservative subproblem on a under-trained batch. The conservative subproblem accelerates the under-trained batch without drastic weight changes. The update equation in line 7 corresponds to Eq. 18. Specifically, $[\psi_w(d_t)-\text{limit}]\nabla\psi_w(d_t)$ is the gradient of $\frac{1}{2}P\psi_w(d_t)-\text{limit}P_2^2$ to accelerate the training of a under-trained batch; the second term, $$\frac{\varepsilon}{n_w}(w - w_{t-1}),$$

is the gradient of $$\frac{\varepsilon}{2n_w} Pw - w_{t-1} P_2^2$$

that bounds significant weight changes.

The limit is the same upper control threshold in Alg. 1. The stop specifies the maximal approximate iterations to reflect the early stopping. ζ is a constant learning rate.

The neural network training needs gradually decrease the learning rate to ensure the convergence. It is a common tactic to decrease the learning rate w.r.t training iterations. The inconsistent iterations of ISGD requires a new way to guide the learning rate. Instead, ISGD decreases the learning rate w.r.t the average loss of a dataset. The average loss is better than iterations, as it directly reflects the training status of the model, while calculating the average loss of a dataset is expensive. Since the average loss in Eq. 13 is from the latest scan of dataset (or losses in an epoch), it is approximate to the average loss of dataset. Hence, we use the average loss (Algorithm 1, line 19) to guide the learning rate.

Extend to Other SGD Variants

It is straight forward to extend the inconsistent training to other SGD variants. For example, Momentum updates the weight with the following equations $$v_{t+1} = \mu v_t - \alpha \nabla \psi(w_t)$$

$$w_{t+1} = w_t + v_{t+1} \quad (19)$$

and the Nesterov accelerated gradient follows the update rule of $$v_{t+1} = \mu v_t - \alpha \nabla \psi(w_t + \mu v_t)$$

$$w_{t+1} = w_t + v_{t+1} \quad (20)$$

To introduce the inconsistent training to these SGD variants, we only need change the line 21 of Algorithm 1 according to Eq. 19 and Eq. 20, respectively. The Algorithm 2 remains the same.

Parallel ISGD

ISGD scales over the distributed or multiGPU system using MPI-style collectives such as broadcast, reduce, and allreduce. Algorithm 1 and Algorithm 2 are already the parallel version manifested by the collectives in them.

Figure 9:
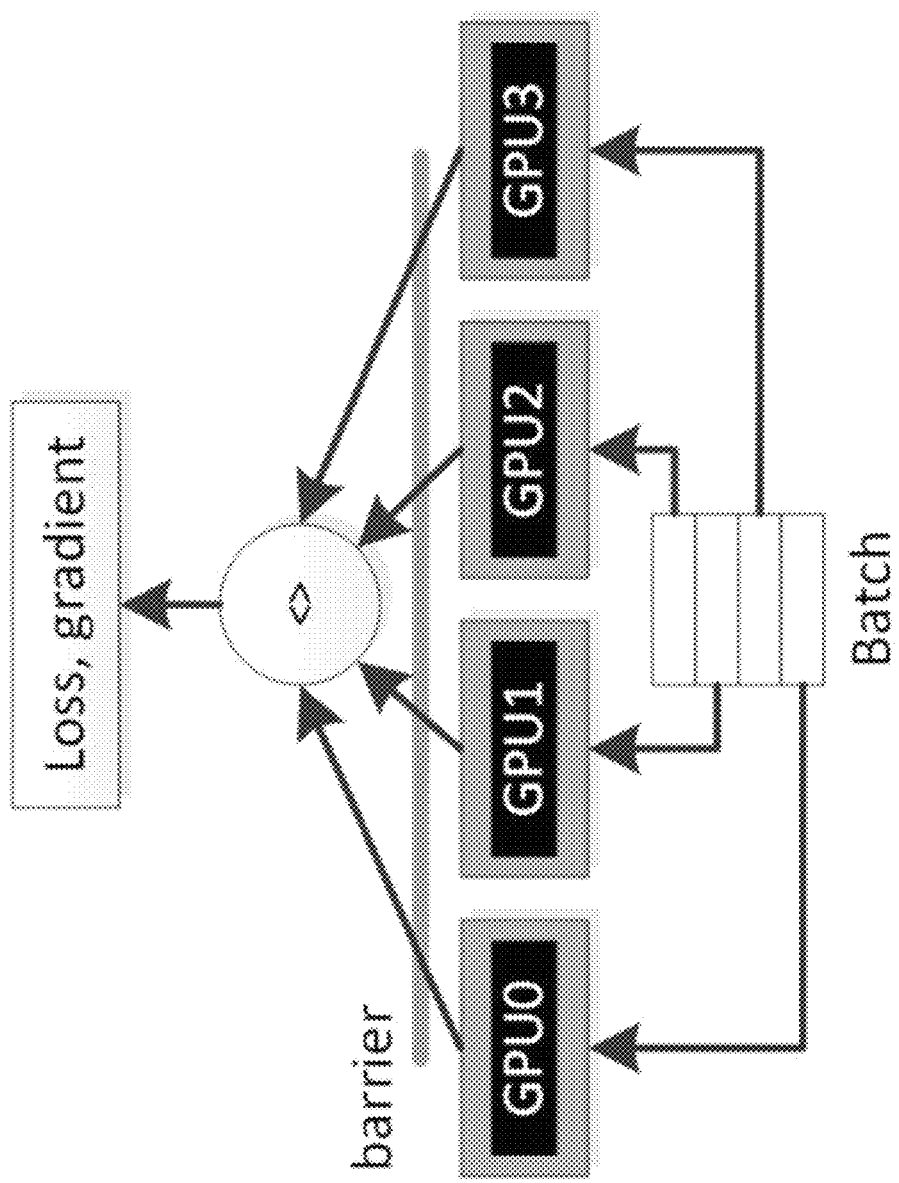
FIG. 9 is a schematic block diagram illustrating data parallelization inside ISGD according to aspects of the present disclosure.

FIG. 9 illustrates the data parallelization scheme inside ISGD. Let's assume there are n computing nodes, each of which is a GPU or a server in a cluster. Each node contains a model duplicate. A node fetches an independent segment of the original batch referred to as the sub-batch. Subsequently, all nodes simultaneously calculate sub-gradients and sub-losses with the assigned sub-batches. Once the calculation is done, the algorithm reduce sub-gradients and sub-losses (Line 10-12 in Algorithm 1) to a master node so as to acquire a global gradient and loss. Then, the master node updates network weights (line 21 in Algorithm 3) and broadcast (line 9 in Algorithm 3) the latest weights. Therefore, ISGD separates the algorithm from the system configurations by employing MPI-style collectives. Since MPI is an industrial and academia standard, ISGD is highly portable on various heterogeneous distributed system.

Batch Size and Convergence Speed

Batch size is the key factor to the parallelism of ISGD. As operations on a batch are independent, scaling ISGD on systems with the massive computing power prefers a sufficiently large batch. An unwieldy large batch size, however, is detrimental to the convergence rate under the limited computing budget. Current convergence rate analysis utilizes iterations as the only performance metric, but it fails to consider the fact that an iteration faster algorithm may cost more time than the slower counterpart. Hence, it is practical to analyze the convergence rate in the time domain.

Let's assume the maximal processing capability of a system is $C_1$ images per second, and the time spent on synchronizations is $C_2$ seconds. Network cost is a constant because it only depends on the size of network parameter. A gradient update essentially costs:

$$t_{iter} = t_{comp} + t_{comm} \quad (21)$$

$$= \frac{n_b}{C_1} + C_2$$

where $n_b$ is the batch size. Given fixed time t, the number of gradient updates is $$T = \frac{t}{t_{iter}} \quad (22)$$

After T gradient updates, the loss is bounded by $$\psi \frac{1}{\sqrt{n_b T}} + \frac{1}{T} \quad (23)$$

Let's assume equality in Eq. 23 and substitute Eq. 22. It yields Eq. 24 that governs loss ψ, time t and system configurations $C_1$ and $C_2$:

$$\psi t = \sqrt{t} \sqrt{\frac{n_b + C_1 C_2}{n_b C_1}} + \frac{n_b}{C_1} + C_2 \quad (24)$$

Figure 10:
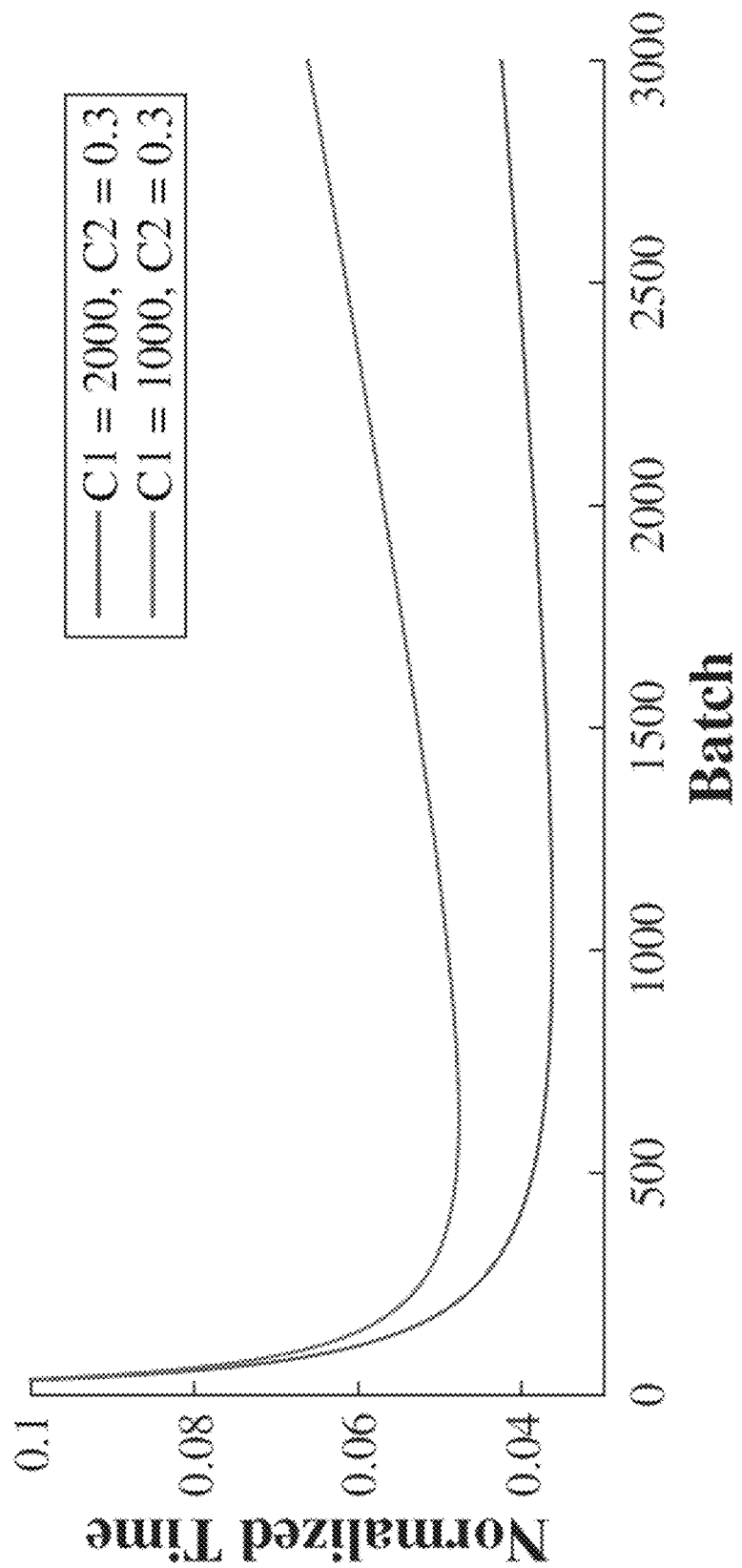
FIG. 10 is a graph illustrating predicted training time under two system configurations at different batch sizes according to aspects of the present disclosure.

FIG. 10 illustrates the predicted training time under two system configurations calculated by Eq. 24 at different batch sizes $n_b \in (0,3000)$. By fixing ψ, the equation approximates the total training time under different batches. The figure demonstrates the optimal batch size of the first and second system are 500 and 1000 respectively. In this case, a faster system needs a larger batch. The performance of both systems deteriorates afterward. As a result, the optimal batch size is a tradeoff between system configurations and algorithmic convergences.

Experimental

In this section, we demonstrate the performance of inconsistent training against SGD variants such as Momentum and Nesterov on a variety of widely recognized datasets including MNIST, CIFAR-10 and ImageNet. MNIST has 60000 handwritten digits ranging from 0 to 9. CIFAR-10 has 60000 32×32 RGB images categorized in 10 classes. ILSVRC 2012 ImageNet has 1431167 256×256 RGB images depicting 1000 object categories. We use LeNet, Caffe CIFAR-10 Quick, and AlexNet to train on MNIST, CIFAR-10, and ImageNet, respectively. The complexity of networks is proportional to the size of datasets. Therefore, our benchmarks cover the small, middle, and large scale CNN training.

We conduct the experiments on a multiGPU system with 4 NVIDIA Maxwell TITAN X. The CUDA version is 7.5, the compiler is GCC 4.8.4. The machine has 64 GB RAM and 1TB SSD. CPU is Xeon E5 4655 v3. Caffe is built with the cuDNN version 4. The GPU machine was exclusively owned by us during the benchmark.

The average top accuracy and time reported from the training with ISGD and SGD on MNIST, CIFAR and ImageNet. IMP stands for the ISGD's improvement over SGD. The data is collected from 10 runs, and ISGD consistently outperforms SGD on 3 datasets.

TABLE 1

|  | HR Top/Top 5 Accuracy | | | Average Top/Top 5 Accuracy | | |
| --- | --- | --- | --- | --- | --- | --- |
|  | SGD | ISGD | IMP | SGD | ISGD | IMP |
| MNIST | 99.08% | 99.19% | 0.11% | 99.05% | 99.17% | 0.12% |
| CIFAR | 76.01% | 76.55% | 0.54% | 75.78% | 76.43% | 0.64% |
| ImageN | 82.12% | 81.10% | 1.01% | 81.83% | 80.56% | 1.27% |

| | Normalized Average Time to Top/Top-5 Accuracy | | |
| --- | --- | --- | --- |
|  | SGD | ISGD | IMP |
| MNIST | 1 | 0.744 | 25.6% |
| CIFAR | 1 | 0.722 | 22.78% |
| ImageN | 1 | 0.8547 | 14.53% |

Qualitative Evaluation of Inconsistent Training

This section intends to qualitatively evaluate the impacts of inconsistent training. The purpose of inconsistent training is to rebalance the training effort across batches so that the large-loss batch receives more training than the small-loss one. To qualitatively evaluate the impacts of inconsistent training, we exam the progression of the loss distribution, the average loss, the standard deviation of batch's loss distribution, as well as the validation accuracy. We setup the training with Caffe CIFAR-10 Quick network on CIFAR-10 dataset. The batch size is set at 2500 yielding 20 independent batches. FIG. 11(A) and FIG. 11(B) present the loss distribution of 20 batches in the training. We arrange losses in epochs as the solver explores a batch only once in an epoch.

The inconsistent training has the following merits. 1) ISGD converges faster than SGD due to the improvement of training model. We measure the convergence rate by the average loss of batches in a dataset, and the method conforms to the training definition in Eq. 3. The average loss data in FIG. 11(D) demonstrates that ISGD converges faster than SGD. In contrast with SGD, the lower average loss of ISGD after iter>7000

Figure 11C:
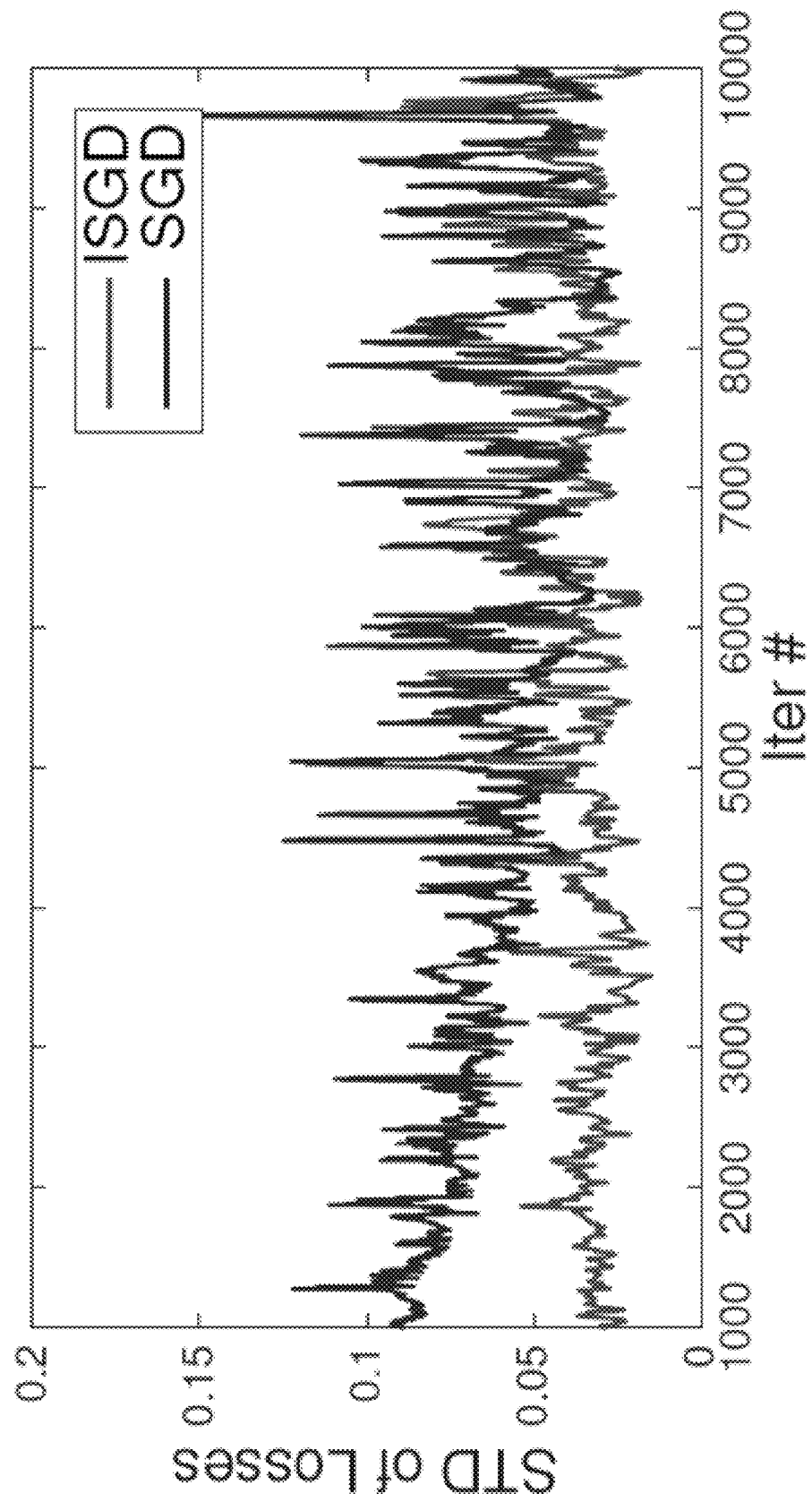
Figure 11D:
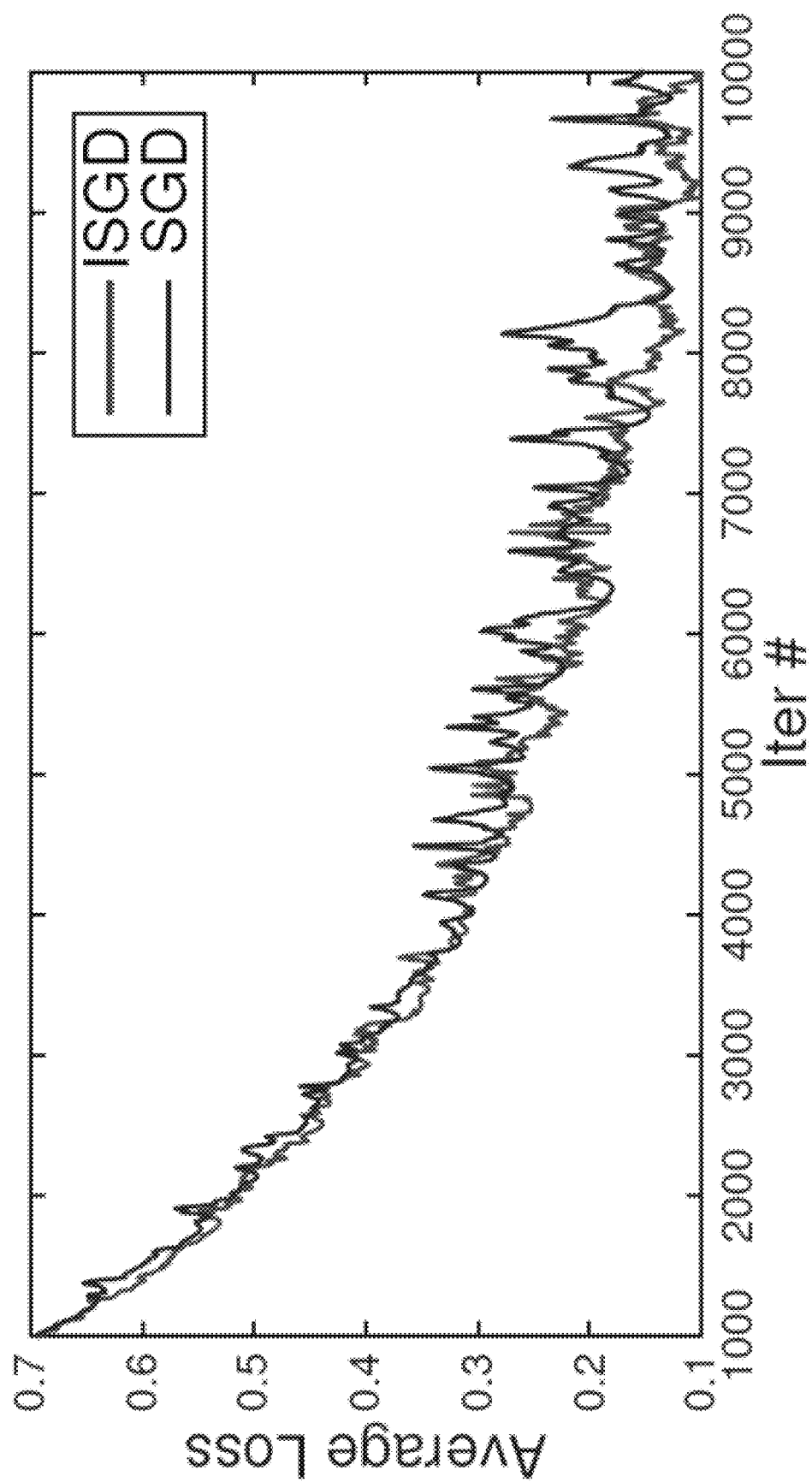
Figure 11E:
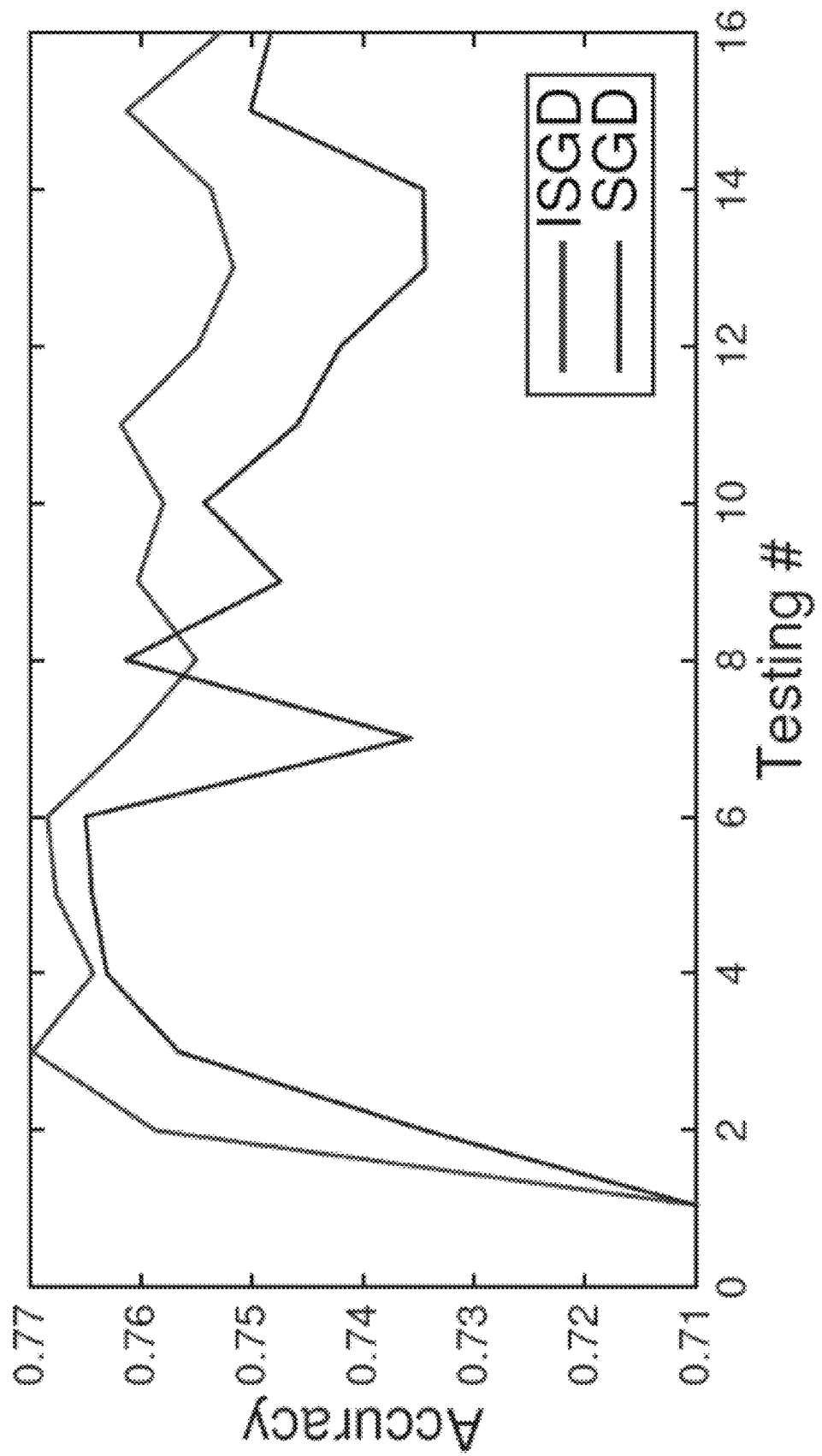

FIG. 11(D) illustrates the better accuracy of ISGD after testing 9 (FIG. 11(E)). The validation accuracy of ISGD in FIG. 11(E) is also above SGD, that is consistent with data in FIG. 11(D) that the average loss of ISGD is below the average loss of SGD in the training. These justify the convergence advantage of inconsistent training. 2) ISGD dynamically accelerates the large-loss batch in the progress of training to reduce the training gap with small-loss batches. Therefore, the variation of batch's training status is less than the one trained by SGD. Please note we measure the training status of a batch with its loss, and the variation of batch's training status is measured by the standard deviation of batch's loss distribution.

FIG. 11(C) illustrates the inconsistent training successfully attenuates the training variations among batches. When iter ∈ [1000,6000], the std of batch's loss distribution of ISGD is much lower than SGD. The result is also consistent with the loss distribution in FIG. 11(A) and FIG. 11(B), in which the loss distribution of SGD is much wider than ISGD at epoch ∈ [50,300].

Performance Evaluations

The setup of each comparisons, ISGD V.S. SGD, has been carefully set to be the single factor experiment, i.e. the only difference is the inconsistent training. Some parameters of SGD greatly affect the training performance, setting different values on them jeopardizes the credibility of experiments. Therefore, we ensure the parameters of SGD and ISGD to be same in each comparison. The first parameter considered is the learning rate. The MNIST tests adopt a constant learning rate of 0.01, and CIFAR tests adopt a constant learning rate of 0.001. Both cases are consistent with the solver defined in Caffe. Caffe fixes the learning rate for these two cases because networks yield the satisfactory accuracies, 75% on CIFAR and 99% on MNIST, without shrinking the learning rate. Since AlexNet has to shrink lr, the learning rate of it has 3 possibilities: lr=0.015 if the average loss $\bar{\psi} \in [2.0,+\infty]$, lr=0.0015 if $\bar{\psi}$ in [1.2,2.0), and lr=0.00015 if $\bar{\psi}$ in [0,1.2). The batch size is also same for each comparison in CIFAR, MNIST and ImageNet. We adopt a large batch to fully saturate 4 GPUs. For other parameters such as the weight decay and momentum, they are also same through all the tests.

Figure 12A:
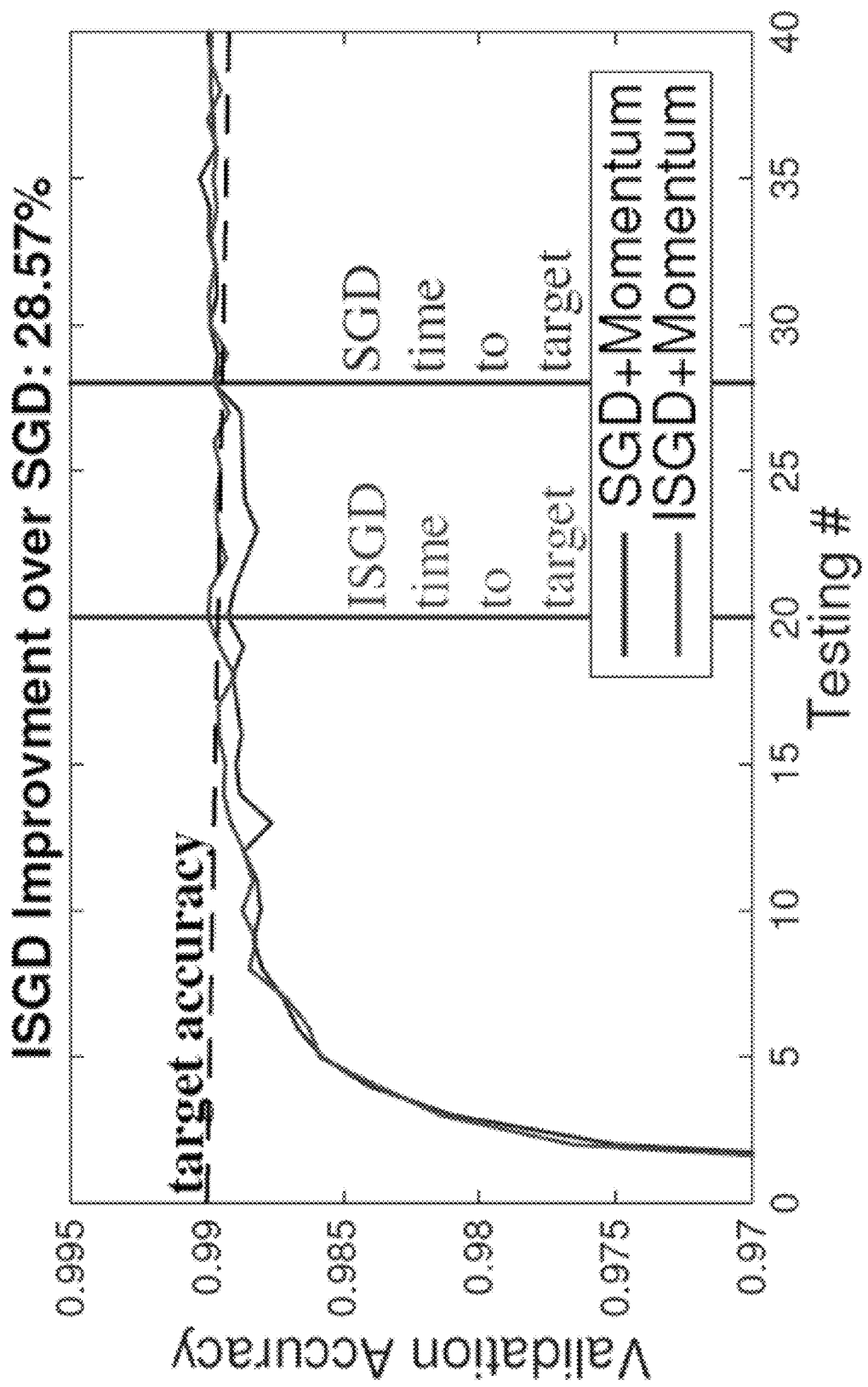
Figure 12B:
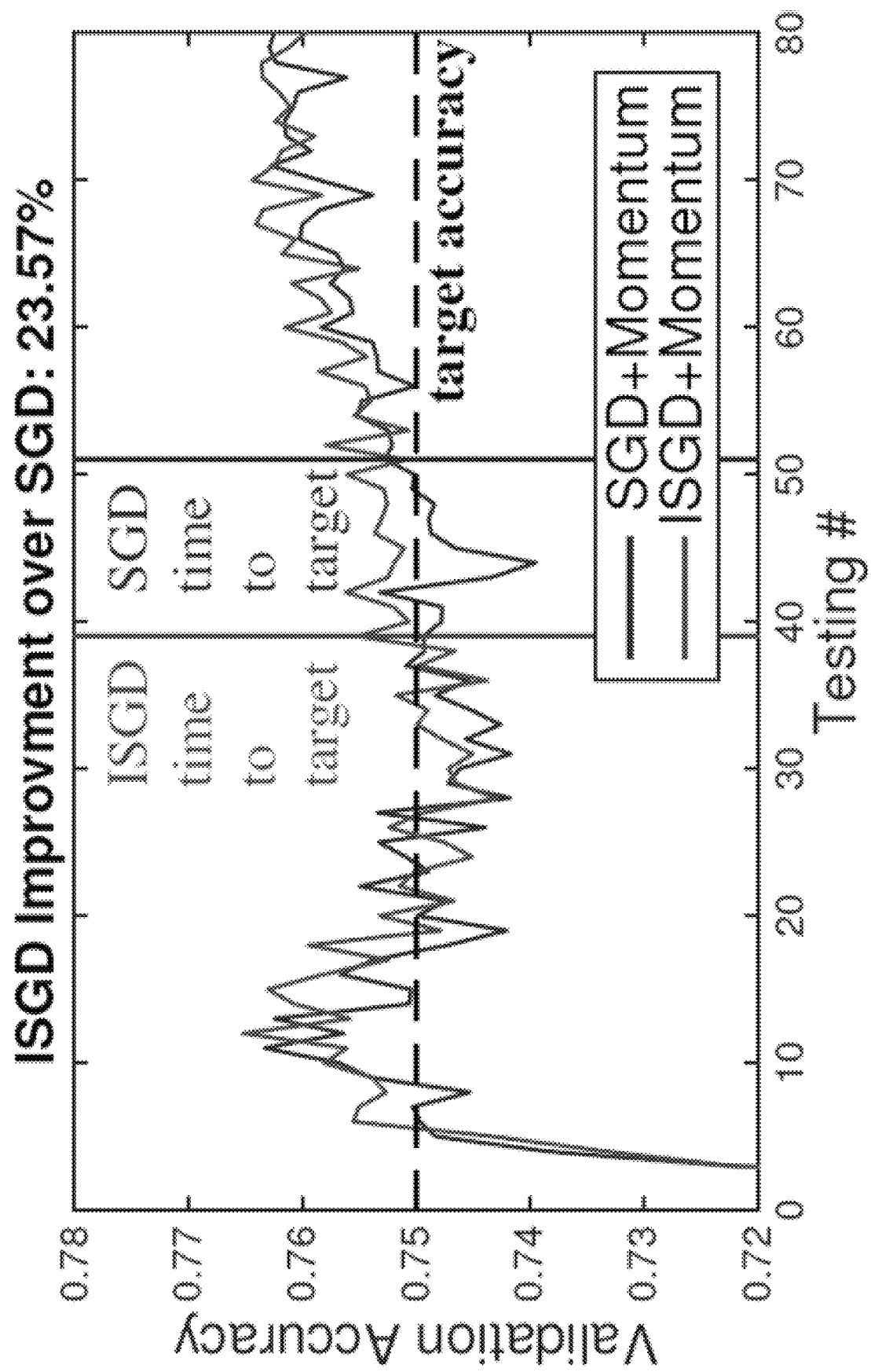

ISGD consistently outperforms SGD in all tests manifesting the effectiveness of inconsistent training. Please note both methods incorporate the momentum term. Since an iteration of ISGD is inconsistent, we test every other 2, 6, 900 seconds (only count the training time with the test time excluded) for MNIST, CIFAR and ImageNet tests, respectively. The horizontal dashed line represents the target accuracy, and the total training time starts from 0 to the point that the validation accuracy is consistently above the dashed line. In the ImageNet test, ISGD demonstrates the 14.94% faster convergence than SGD. SGD takes 21.4 hours to reach the 81% top 5 accuracy, while ISGD takes 18.2 hours (FIG. 13(C)). In the CIFAR test, ISGD demonstrates 23.57% faster convergence than SGD. The top accuracy for CIFAR-Quick network reported on CIFAR-10 is 75%. After 306 seconds, the test accuracy of SGD is steadily above 75%, while ISGD only takes 234 seconds (FIG. 12(B)). Finally, ISGD demonstrates 28.57% faster convergence than SGD on MNIST dataset. It takes SGD 56 seconds to reach the 99% top accuracy, while ISGD only takes 40 seconds. Since the training is essentially a stochastic process, the performance subjects to changes. We repeat each test cases 10 times, and we list the performance data in Tables. 1. The results also uphold the convergence advantages of inconsistent training.

Figure 12C:
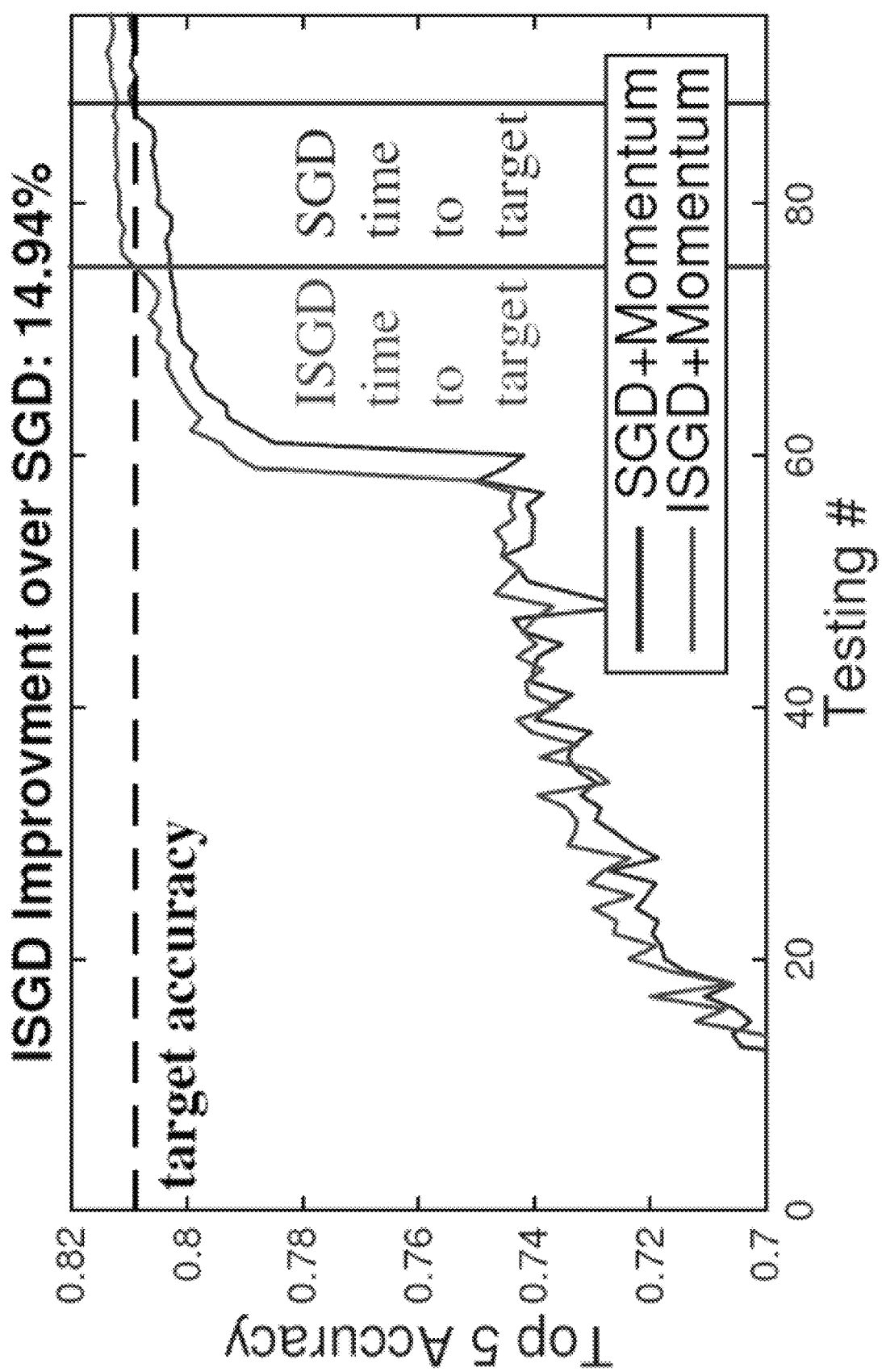
Figure 12D:
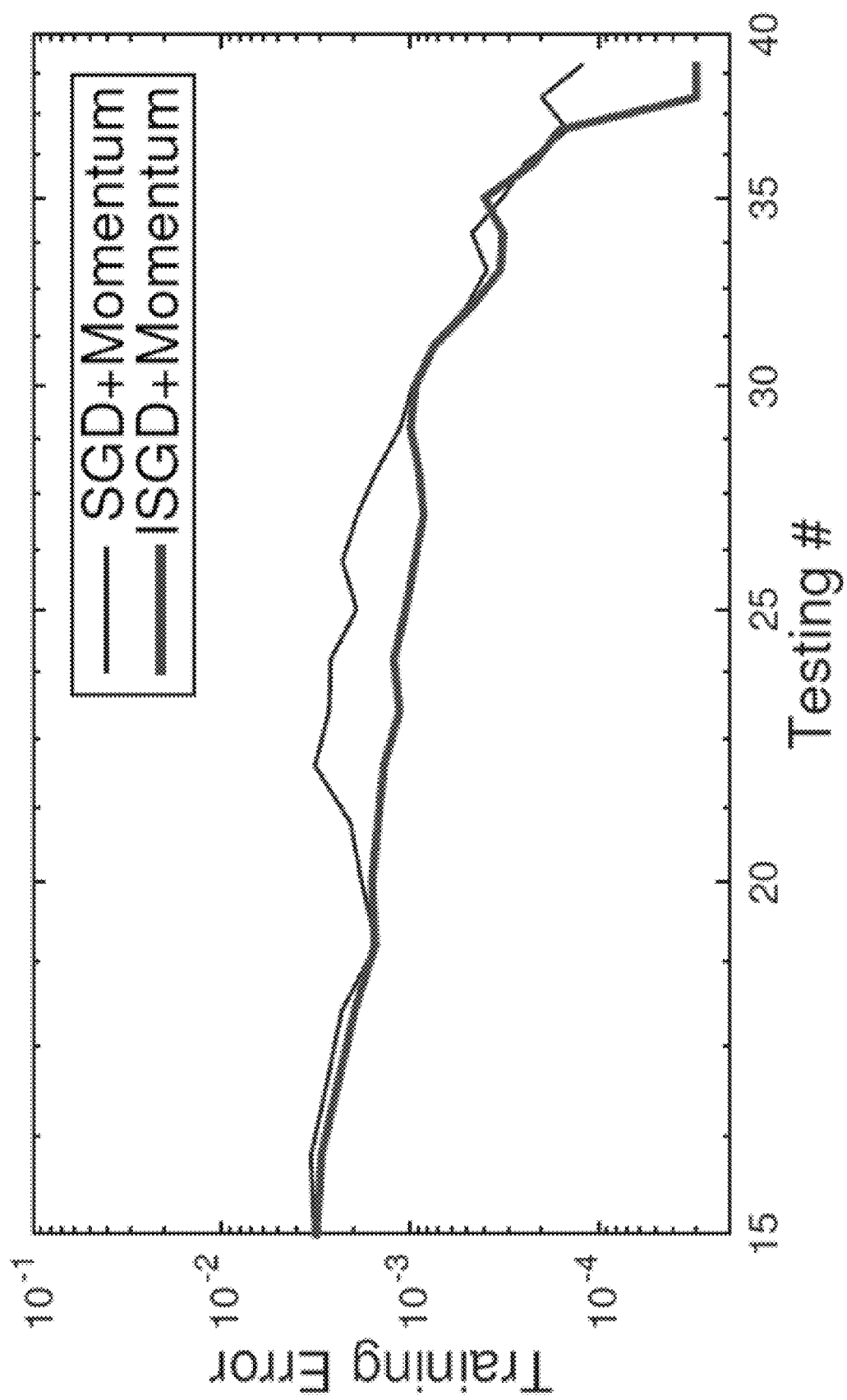
Figure 12E:
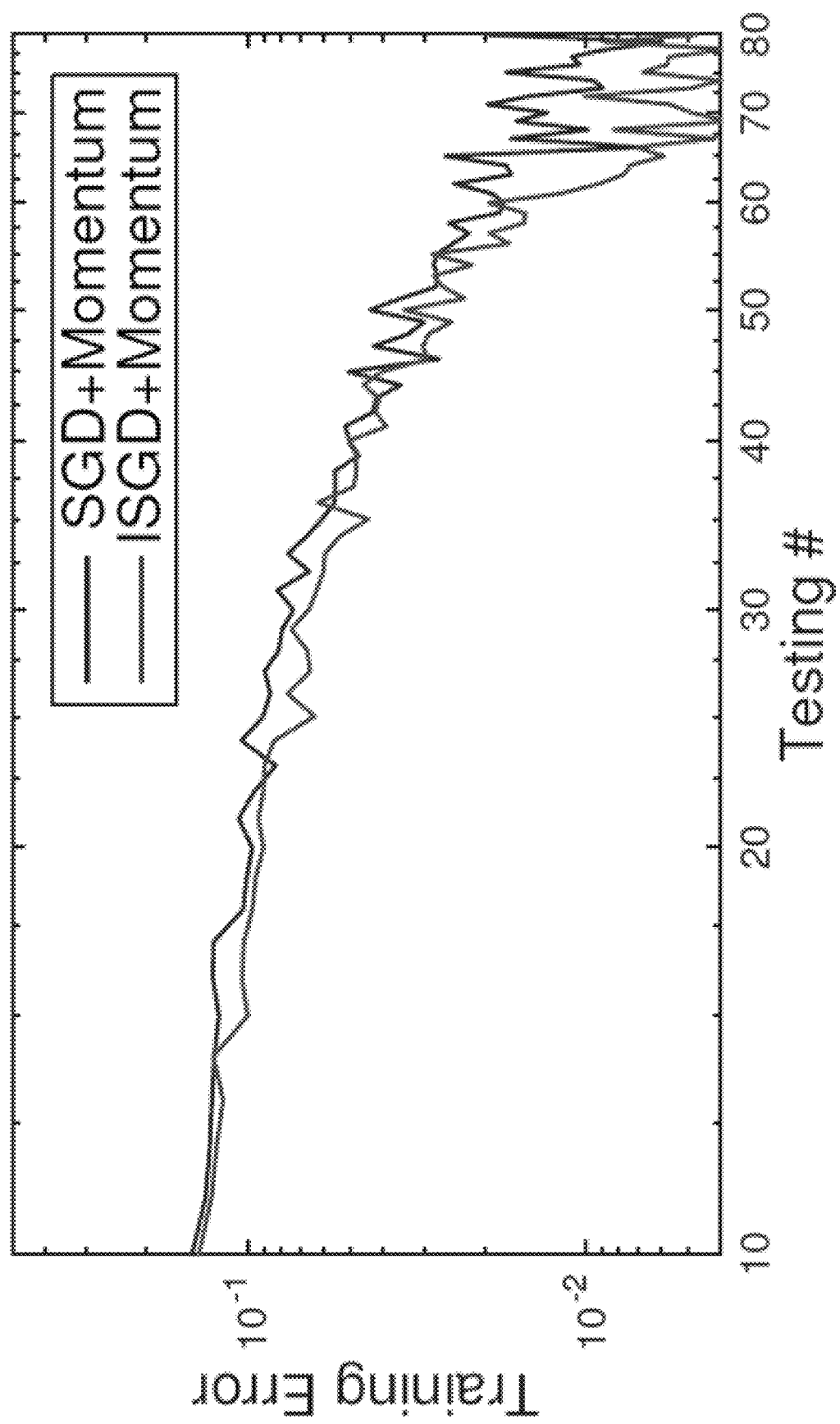
Figure 12F:
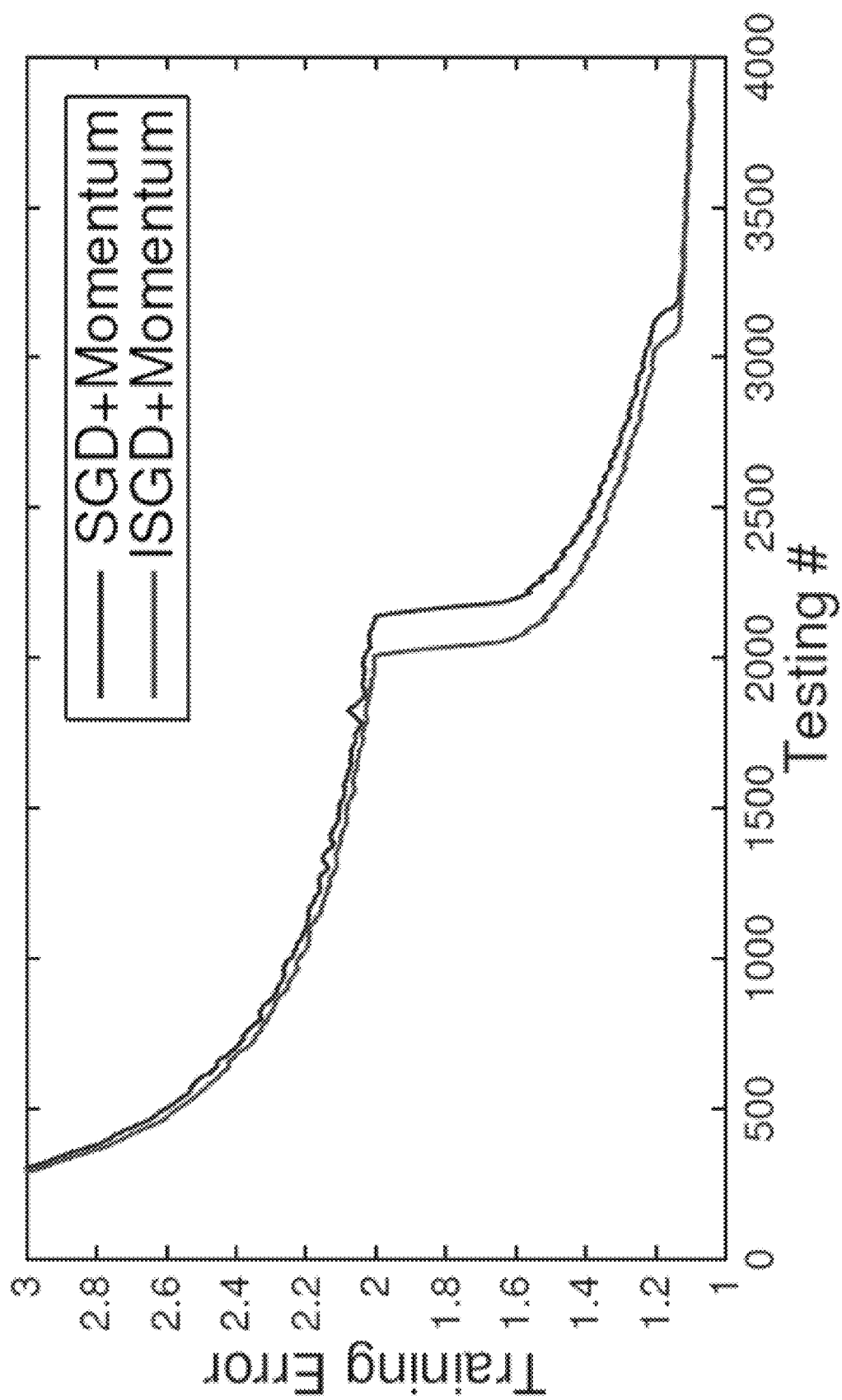

To explain the performance advantages of ISGD, we also use the training dataset to test. Whereas, the training set of ImageNet 256 GB is too large to be tested, we use $\bar{\psi}$ in Algorithm 3 to approximate the training error. FIG. 12(D), FIG. 12(E) and FIG. 12(F) demonstrate the training error of ISGD is consistently below the SGD. The results demonstrate the benefit of inconsistent training, and they also explain the good validation accuracy of ISGD in FIG. 12(A), FIG. 12(B) and FIG. 12(C).

Figure 14A:
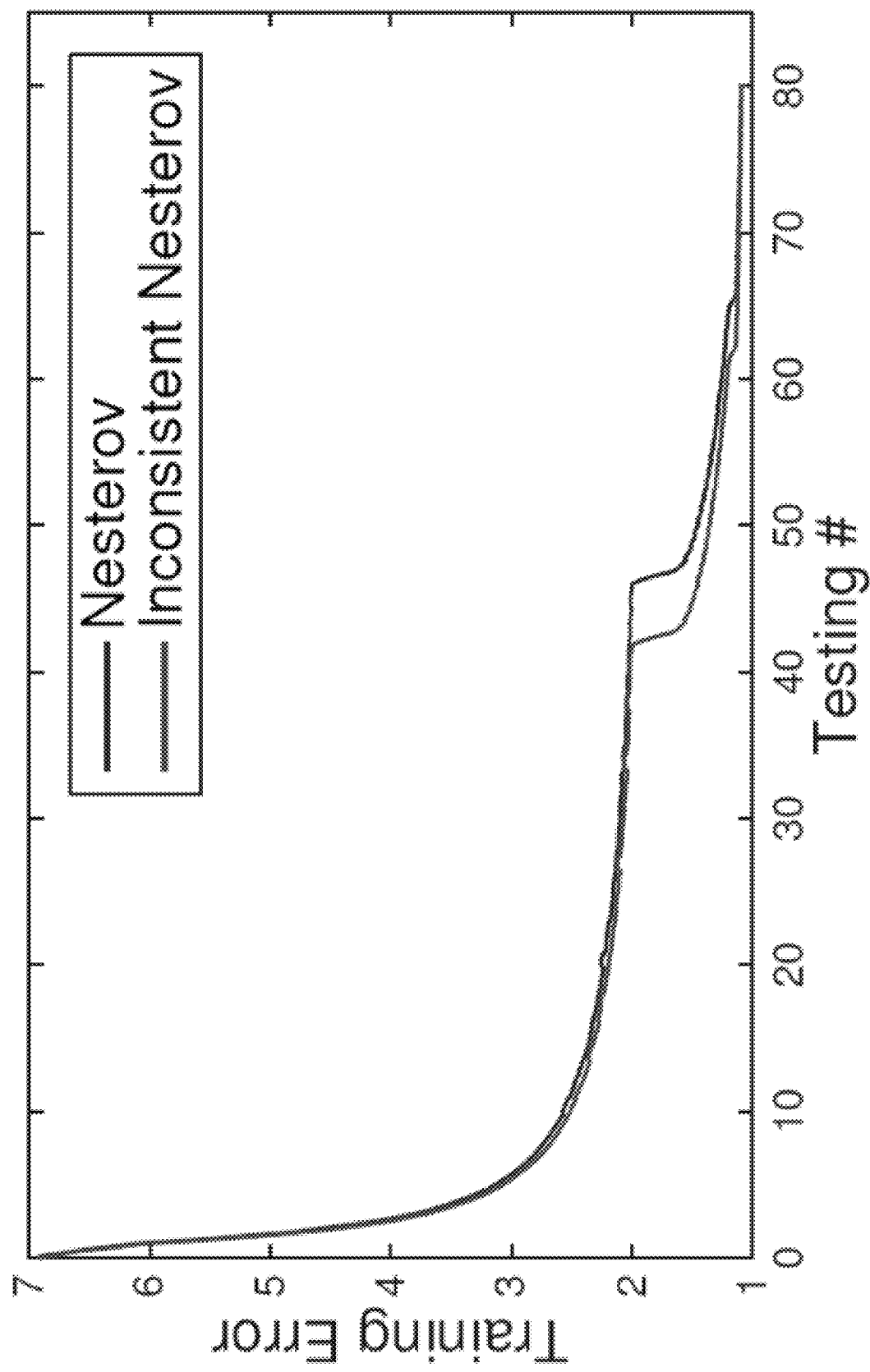
Figure 14B:
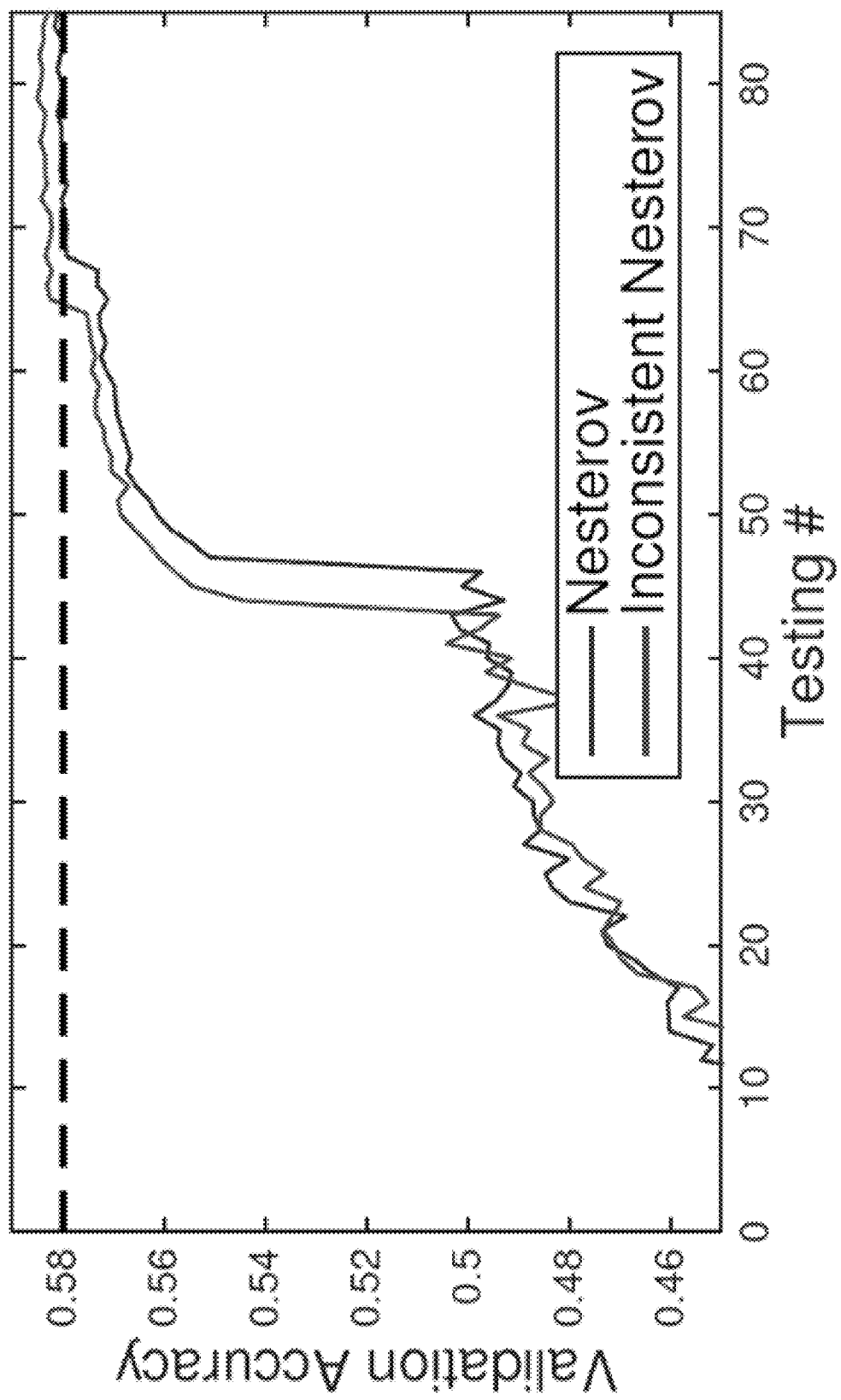

The inconsistent training is also compatible with the Nesterov accelerated gradient. FIGS. 14(A) and 14(B) illustrates the validation accuracy and the training loss progression on ImageNet trained with the Nesterov accelerated gradient. The inconsistent training beats the regular Nesterov method. If set 58% top 1 accuracy as the threshold, the inconsistent training takes 65 tests to exceed the threshold, while the regular one takes 75 tests. Please note the time interval of two consecutive tests is fixed. Therefore, the inconsistent training demonstrates the 13.4% performance gain. The compatibility is under our expectation. The Nesterov method accelerates the convergence by considering the curvature information, while ISGD rebalances the training across batches.

Time Domain Convergence Rate W.R.T Batch Size on MultiGPUs

Figure 13A:
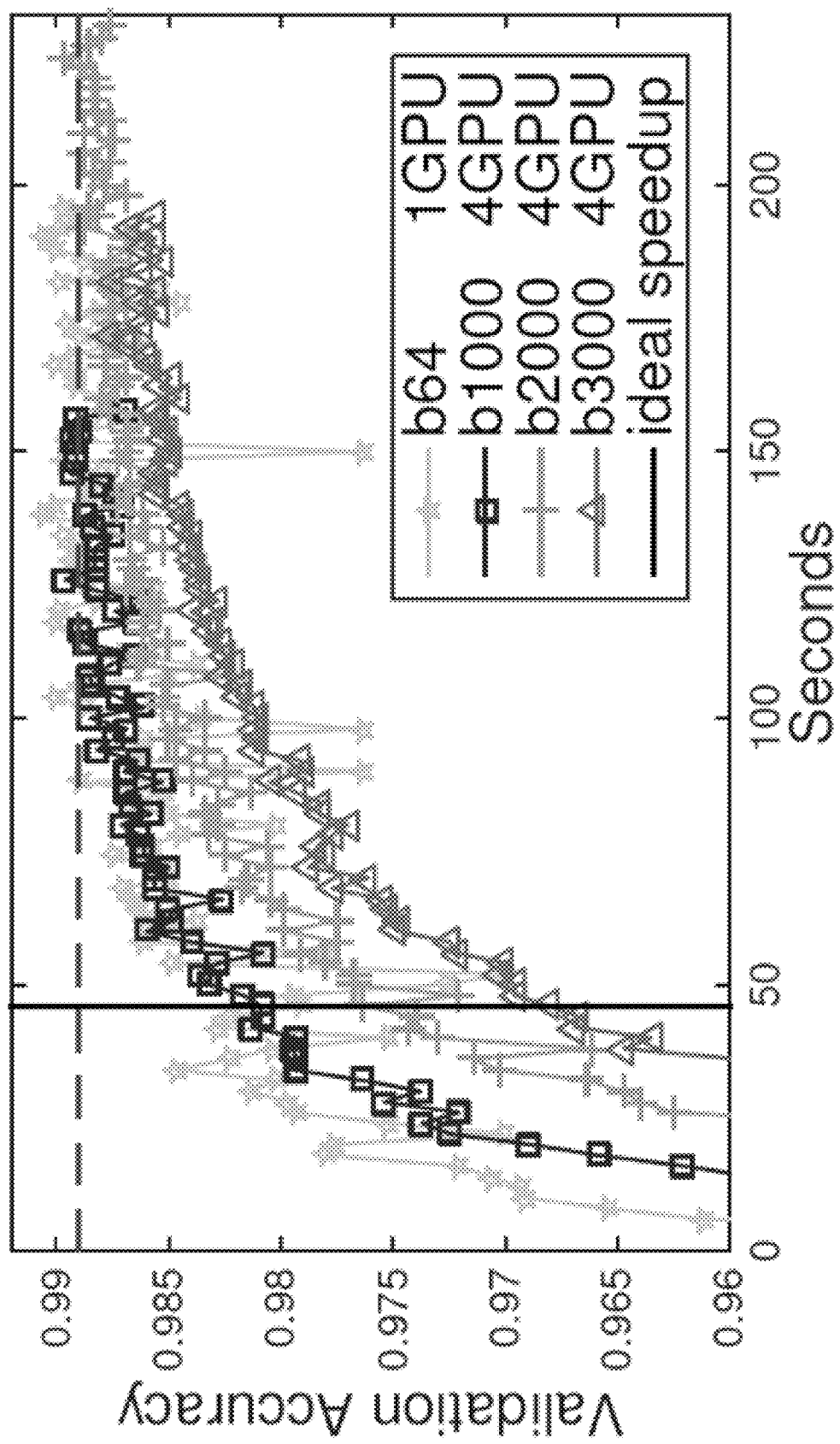
Figure 13B:
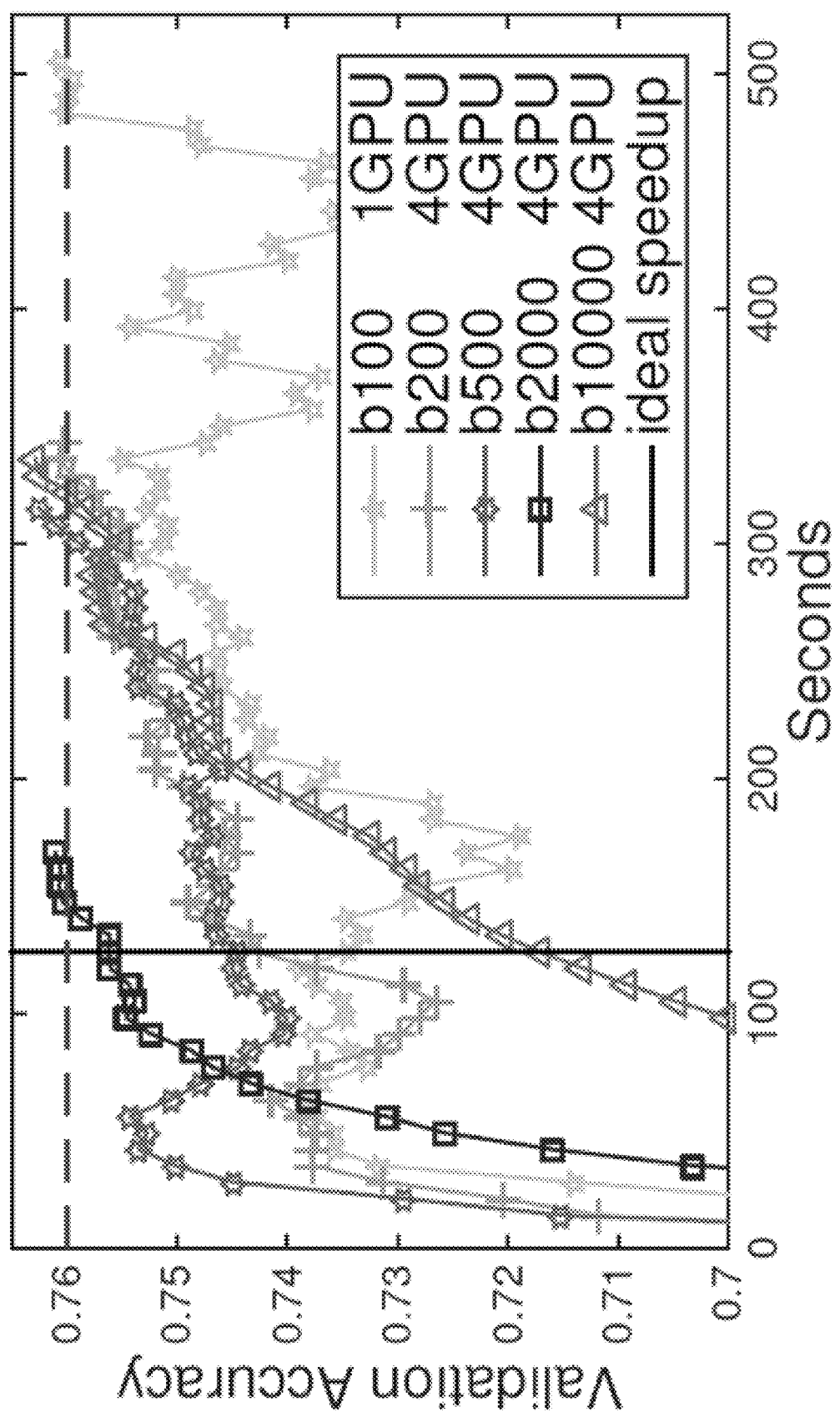
Figure 13C:
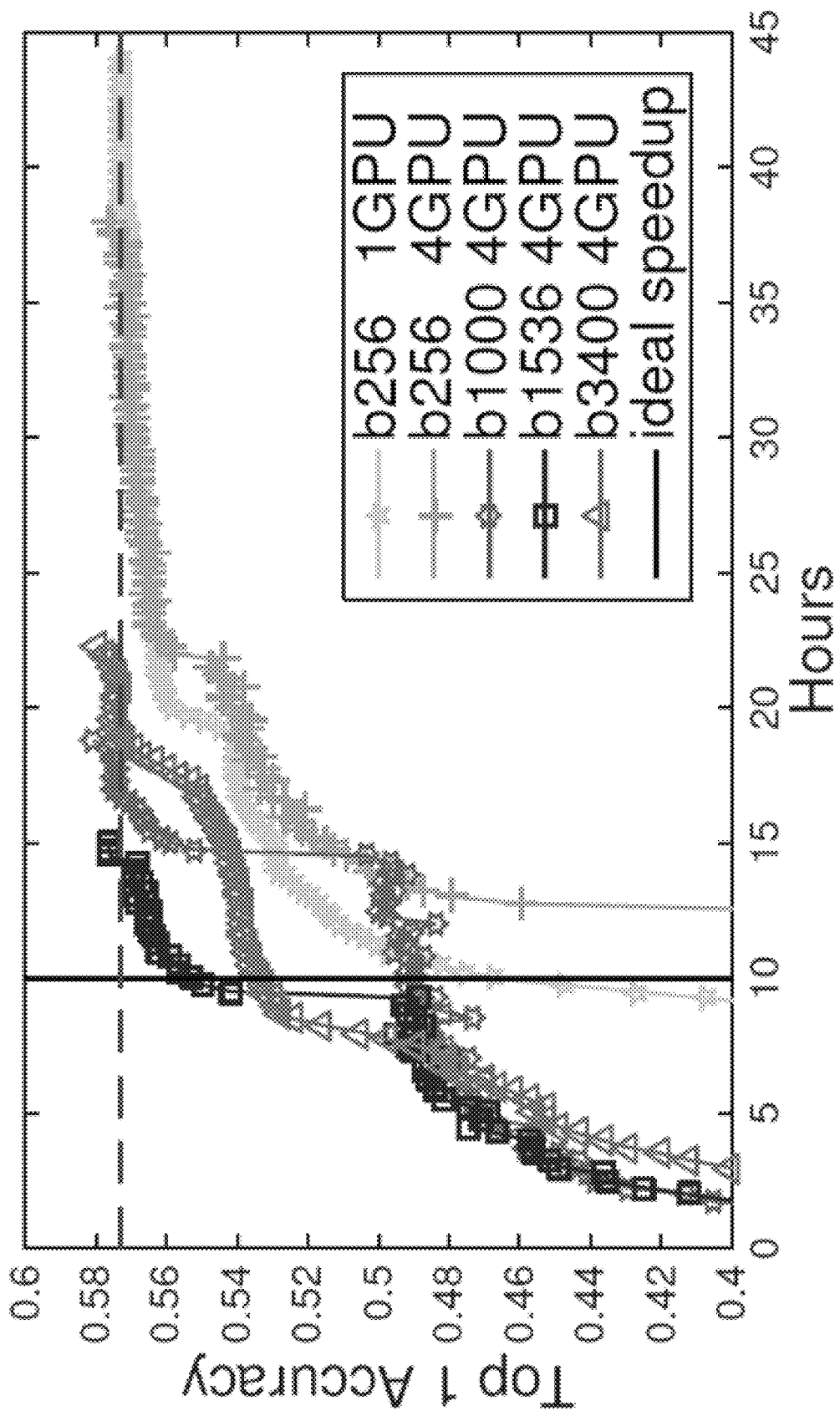

FIGS. 13(A)-13(C) illustrate convergence speeds at different batch sizes on MNIST, CIFAR and ImageNet datasets. The figures reflect the following conclusions: 1) A sufficiently large batch is necessary to the multiGPU training. The single GPU only involves computations $t_{compt}$, while the multiGPU training entails an additional term $t_{comm}$ for synchronizations. A small batch size for the single GPU training is favored to ensure the frequent gradient updates. In the multiGPU training, the cost of synchronizations linearly increases with the number of gradient updates. Increasing batch size improves the convergence rate, thereby fewer iterations and synchronizations. Besides, it also improves system utilizations and saturations. As a consequence, a moderate batch size is favored to the multiGPU training as indicated in FIGS. 13(A)-13(C). 2) An unwieldy batch size slows down the convergence. Because computations linearly increase with the batch size, which reduces the number of gradient updates in a limited time. The declined convergence speed is observable in the FIG. 13(A), FIG. 13(B) and FIG. 13(C) when batch size is set at 3000, 10000, 3400, respectively.

Summary

In this disclosure, we describe inconsistent training to dynamically adjust the training effort w.r.t batch's training status. ISGD models the training as a stochastic process, and it utilizes techniques in Stochastic Process Control to identify a large-loss batch on the fly. Then, ISGD solves a new subproblem to accelerate the training on the under-trained batch. Extensive experiments on a variety of datasets and models demonstrate the promising performance of inconsistent training.

At this point, while we have presented this disclosure using some specific examples, those skilled in the art will recognize that our teachings are not so limited. Accordingly, this disclosure should be only limited by the scope of the claims attached hereto.

The invention claimed is:

1. A method comprising:
   training, by at least one computing device, a convolutional neural network (CNN) with an inconsistent stochastic gradient descent (ISGD) algorithm using a training data set;
   wherein said training includes executing the ISGD algorithm for a number of iterations;
   wherein said computing device includes a plurality of processors and said method further comprises parallelizing, by the at least one computing device, at least a portion of any computations of the inconsistent stochastic gradient descent algorithm on the plurality of processors;
   wherein the CNN is trained with batches of training data and the batches are classified as under-trained status or well-trained status based upon a loss determination;
   wherein any batches classified as under-trained are continued to be trained until its determined loss falls below a pre-determined threshold or a pre-determined number of iterations is reached; and
   wherein said continued training is defined by the following problem:

$$\min_w \varphi_w(d_t) = \frac{1}{2}\|\psi_w(d_t) - \text{limit}\|_2^2 + \frac{\varepsilon}{2n_w}\|w - w_{t-1}\|_2^2$$

where $n_w$ is the number of weight parameters in the network, $\psi_w$ is a loss function with weight vector w, $d_t$ is a batch of images and $\varepsilon$ is a parameter for the second term that adjusts a conservative constraint that is preferably $10^{-1}$, limit, $w_{t-1}$ and $d_t$ are constants, and the first term minimizes the difference between the loss of current under-trained batch $d_t$ and a control limit.

2. A method comprising:
   training, by at least one computing device, a convolutional neural network (CNN) with an inconsistent stochastic gradient descent (ISGD) algorithm using a training data set;
   wherein said training includes executing the ISGD algorithm for a number of iterations;
   wherein said computing device includes a plurality of processors and said method further comprises parallelizing, by the at least one computing device, at least a portion of any computations of the inconsistent stochastic gradient descent algorithm on the plurality of processors;
   wherein the CNN is trained with batches of training data, and batches are classified as under-trained status or well-trained status based upon a loss determination;
   wherein a batch is classified as under-trained if the loss is larger than a control limit defined by:

$$\bar{\psi} + 3*\sigma_\psi;$$

wherein $\bar{\psi}$ is a descriptive statistic representing a running average loss and $\sigma_\psi$ is a descriptive statistic representing a running standard deviation during training.

* * * * *